(12) United States Patent
Nagahara et al.

(10) Patent No.: US 9,195,034 B2
(45) Date of Patent: Nov. 24, 2015

(54) LENS FOR PROJECTION AND PROJECTION-TYPE DISPLAY APPARATUS

(71) Applicant: FUJIFILM CORPORATION, Tokyo (JP)

(72) Inventors: Akiko Nagahara, Saitama-Ken (JP); Yukiko Nagatoshi, Saitama-Ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/515,549

(22) Filed: Oct. 16, 2014

(65) Prior Publication Data

US 2015/0036228 A1 Feb. 5, 2015

Related U.S. Application Data

(63) Continuation of application No. PCT/JP2013/002512, filed on Apr. 12, 2013.

(30) Foreign Application Priority Data

Apr. 18, 2012 (JP) ................................. 2012-094480

(51) Int. Cl.
*G02B 9/12* (2006.01)
*G02B 13/04* (2006.01)
*G02B 13/18* (2006.01)
*G02B 13/16* (2006.01)
(Continued)

(52) U.S. Cl.
CPC ............ *G02B 13/16* (2013.01); *G02B 13/0045* (2013.01); *G02B 13/04* (2013.01); *G02B 13/18* (2013.01); *H04N 9/317* (2013.01)

(58) Field of Classification Search
CPC .............. G02B 9/00; G02B 9/12; G02B 9/64; G02B 13/04
USPC .......... 359/708, 716, 745, 748, 749, 754, 784
See application file for complete search history.

(56) References Cited

U.S. PATENT DOCUMENTS 4,806,003 A * 2/1989 Mukai et al. ................. 359/750
6,160,671 A 12/2000 Nakazawa
(Continued)

FOREIGN PATENT DOCUMENTS

| JP | 11-326755 | 11/1999 |
| JP | 2000-111797 | 4/2000 |

(Continued)

OTHER PUBLICATIONS

International Search Report—PCT/JP2013/002512—Sep. 3, 2013.

*Primary Examiner* — Darryl J Collins
(74) *Attorney, Agent, or Firm* — Young & Thompson

(57) ABSTRACT

A lens for projection substantially consists of a negative first lens group, a positive second lens group and a positive third lens group in this order from a magnification side. A reduction side is telecentric, and a most magnification-side lens is an aspheric plastic lens. The third lens group consists of a negative front group and a positive rear group in this order from the magnification side with an air space therebetween. The front group consists of a negative lens and a positive lens in this order from the magnification side with an air space therebetween, and the air space being narrower than the air space between the front group and the rear group. Conditional formula (1): $-0.7<fFG3/f<0.7$ about front focus fFG3 of the third lens group and focal length f of an entire system is satisfied.

20 Claims, 12 Drawing Sheets

EXAMPLE 1

(51) Int. Cl.
*G02B 13/00* (2006.01)
*H04N 9/31* (2006.01)

(56) References Cited

U.S. PATENT DOCUMENTS

| | | | |
|---|---|---|---|
| 6,285,509 | B1 | 9/2001 | Nakayama et al. |
| 6,545,824 | B2 * | 4/2003 | Sensui ............ 359/749 |
| 7,012,758 | B2 | 3/2006 | Masubuchi et al. |
| 7,280,285 | B2 | 10/2007 | Nagahara et al. |
| 7,529,040 | B2 | 5/2009 | Bretthauer |
| 7,663,806 | B2 | 2/2010 | Nagatoshi |
| 8,345,357 | B2 | 1/2013 | Imaoka |
| 2002/0060859 | A1 | 5/2002 | Yoneyama |
| 2005/0195490 | A1 | 9/2005 | Kobayashi |
| 2005/0286136 | A1 | 12/2005 | Masubuchi et al. |
| 2006/0176576 | A1 | 8/2006 | Nagahara et al. |
| 2008/0013192 | A1 | 1/2008 | Bretthauer |
| 2009/0109543 | A1 | 4/2009 | Nagatoshi |
| 2011/0032606 | A1 | 2/2011 | Imaoka |

FOREIGN PATENT DOCUMENTS

| | | |
|---|---|---|
| JP | 2000-171702 | 6/2000 |
| JP | 2011-053663 | 9/2002 |
| JP | 2003-66329 | 3/2003 |
| JP | 2004-233609 | 8/2004 |
| JP | 2005-084456 | 3/2005 |
| JP | 2006-047948 | 2/2006 |
| JP | 2006-215501 | 8/2006 |
| JP | 2008-003615 | 1/2008 |
| JP | 2009-069540 | 4/2009 |
| JP | 2009-104048 | 5/2009 |
| JP | 2009-186790 | 8/2009 |
| JP | 2010-217452 | 9/2010 |
| JP | 4624535 | 2/2011 |
| JP | 2011-221089 | 11/2011 |

* cited by examiner

EXAMPLE 1

EXAMPLE 2

EXAMPLE 3

EXAMPLE 4

EXAMPLE 7

EXAMPLE 1

PROJECTION DISTANCE = INFINITY

PROJECTION DISTANCE = 123.92

EXAMPLE 2

PROJECTION DISTANCE = INFINITY

PROJECTION DISTANCE = 123.93

EXAMPLE 5

LENS FOR PROJECTION AND PROJECTION-TYPE DISPLAY APPARATUS

CROSS-REFERENCE TO RELATED APPLICATIONS

This application is a Continuation of PCT International Application No. PCT/JP2013/002512 filed on Apr. 12, 2013, which claims priority under 35 U.S.C. §119 (a) to Japanese Patent Application No. 2012-094480 filed on Apr. 18, 2012. Each of the above applications is hereby expressly incorporated by reference, in its entirety, into the present application.

BACKGROUND OF THE INVENTION

1. Field of the Invention

The present invention relates to a lens for projection and a projection-type display apparatus. For example, the present invention relates to a lens for projection appropriate to magnify and project rays having video image information from a light valve onto a screen, and also to a projection-type display apparatus using the lens for projection.

2. Description of the Related Art

Conventionally, projection-type display apparatuses for magnifying and projecting images displayed on light valves, such as a liquid crystal display device and a DMD (Digital Micromirror Device: Registered Trademark), were used during presentation and the like. A lens for projection to be mounted on such an apparatus is requested to have, for example, a long back focus to make a color combination optical system arrangeable between the light valve and the projection lens. Further, when the angle dependency characteristics of the color combination optical system are taken into consideration, a reduction side is requested to be telecentric. When the installation characteristics for indoor space setting are taken into consideration, the structure is requested to be compact, and the like.

Further, in recent years, since a widening function for making a large image projectable onto a position close to the projection-type display apparatus is needed, a wider angle of view is requested. Further, the lens system also needs to have a small F-number to realize a projection-type display apparatus with higher brightness. Further, excellent correction of aberrations to cope with a recent high definition light valve is also needed.

As a compact lens for projection consisting of a small number of lens groups, three-group lens systems, for example, as disclosed in Japanese Unexamined Patent Publication No. 2004-233609 (Patent Document 1), Japanese Patent No. 4624535 (Patent Document 2) and Japanese Unexamined Patent Publication No. 2009-186790 (Patent Document 3) are known. In the lens systems, a negative first lens group, a positive second lens group and a positive third lens group are arranged in this order from a magnification side. Further, Japanese Unexamined Patent Publication No. 2000-171702 (Patent Document 4) discloses a projection lens consisting of a positive first lens group, a stop and a positive second lens group.

SUMMARY OF THE INVENTION

In recent years, as competition in development became tough, it became desirable that a lens for projection satisfies plural high-level requests at the same time. Specifically, a lens for projection with a smaller F-number, a wider angle of view and higher performance while the size of the lens is small is requested.

However, in the lens disclosed in Patent Document 1, an F-number is large, and a spherical aberration and curvature of field are also large. Further, a cemented lens is arranged in the vicinity of a stop. Therefore, in a high-brightness projection-type display apparatus of recent years, there is a risk of deterioration of lens performance due to a change in qualities and deterioration of adhesive. In the lenses disclosed in Patent Documents 2 and 4, F-numbers are large. In the lens disclosed in Patent Document 3, an F-number is small. However, regarding both a wider angle of view and correction of curvature of field, further improvement is needed to sufficiently satisfy requests of recent years.

In view of the foregoing circumstances, it is an object of the present invention to provide a lens for projection, the reduction side of which is telecentric, and which achieves a small F-number, a wide angle of view and excellent optical performance at the same time while the size of the lens for projection is small, and also a projection-type display apparatus including such a lens for projection.

A lens for projection of the present invention substantially consists of three lens groups of a first lens group having negative refractive power, a second lens group having positive refractive power, and a third lens group having positive refractive power in this order from a magnification side. A reduction side is telecentric, and an aspheric plastic lens including at least one aspherical surface, and which is made of plastic material, is arranged most toward the magnification side. Further, the third lens group consists of a front group having negative refractive power and a rear group having positive refractive power arranged in this order from the magnification side with an air space therebetween. The front group substantially consists of two lenses of a negative single lens and a positive single lens arranged in this order from the magnification side with an air space therebetween, and the air space being narrower than the air space between the front group and the rear group. Further, the following conditional formula (1) is satisfied:

$$-0.7 < fFG3/f < 0.7 \quad (1), \text{where}$$

fFG3: a front focus of the third lens group, which is the distance along an optical axis from the most magnification side lens surface of the third lens group to the focal point of the third lens group on the magnification side, and f: a focal length of an entire system when projection distance is infinity.

It is desirable that the lens for projection of the present invention satisfies one of the following conditional formulas (2) through (12) or an arbitrary combination thereof:

$$-0.3 < f/fG23 < 0 \quad (2);$$

$$da/f < 0.4 \quad (3);$$

$$1.0 < fG2/fG3 < 1.4 \quad (4);$$

$$0.55 < (Hsm - Im\phi/2)/Hsj \quad (5);$$

$$|Hfm/Im\phi| < 2.0 \quad (6);$$

$$-1.5 < fG1/f < -0.7 \quad (7);$$

$$1.5 < fG2/f < 6.0 \quad (8);$$

$$fG3/f < -3.0 \quad (9);$$

$$2.00 < Bf/f \quad (10);$$

$$FNo < 2.00 \quad (11); \text{ and}$$

$$70° < 2\omega \quad (12), \text{where}$$

fG23: a combined focal length of the second lens group and the third lens group, da: an air space on an optical axis between the negative single lens and the positive single lens in the front group, fG2: a focal length of the second lens group, fG3: a focal length of the third lens group, Hsm: a maximum ray height at a most reduction-side lens surface, Imφ: a maximum effective image circle diameter on the reduction side, Hsj: a maximum ray height of axial rays at the most reduction-side lens surface, Hfm: a maximum ray height at a most magnification-side lens surface, Imφ: a maximum effective image circle diameter on the reduction side, fG1: a focal length of the first lens group, fG3f: a focal length of the front group in the third lens group, Bf: a back focus of the entire system, FNo: an F-number, and 2ω: a maximum full angle of view.

The first lens group in the lens for projection of the present invention may substantially consist of three lenses of an aspheric plastic lens and two negative lenses.

The second lens group in the lens for projection of the present invention may substantially consist of three lenses of a cemented lens having positive refractive power and consisting of two lenses cemented together, and a positive single lens in this order from the magnification side, and one of the two lenses of the cemented lens being a positive lens, and the other one of the two lenses of the cemented lens being a negative lens. In that case, it is desirable that both of the cemented lens and the single lens in the second lens group are biconvex.

The lens for projection of the present invention may be structured in such a manner that focusing is performed by moving at least one of lenses in the first lens group and the second lens group except the aspheric plastic lens.

A projection-type display apparatus of the present invention includes a light source, a light valve on which light from the light source is incident, and the aforementioned lens for projection of the present invention, as a lens for projection that projects an optical image of light that has been optically modulated by the light valve onto a screen.

Here, the term "magnification side" means a projected side (a screen side). The screen side will be referred to as the magnification side also in reduction projection for the sake of convenience. On the other hand, the term "reduction side" means an original image display area side (a light valve side). The light valve side will be referred to as the reduction side also in reduction projection for the sake of convenience.

Here, the expression "substantially consisting of . . . " means that lenses substantially without any refractive power, and optical elements other than lenses, such as a stop and a cover glass, may be included in addition to the lens groups and the lenses mentioned as composition elements.

The "lens group" does not necessarily consist of plural lenses. The lens group may consist of only one lens.

The "single lens" means a lens consisting of one lens, which is not a cemented lens.

The surface shape of the lens and the sign of the refractive power of the lens are considered in a paraxial region when the lens includes an aspherical surface.

Regarding a front side and a back side when "front focus" and "back focus" are considered, the magnification side and the reduction side are regarded as the front side and the back side, respectively.

In conditional formula (1), the sign of a front focus of the third lens group is negative when a magnification-side focal position of the third lens group is located toward the magnification side of the most magnification-side surface of the third lens group, and positive when the magnification-side focal position of the third lens group is located toward the reduction side of the most magnification-side surface of the third lens group.

The sign "Imφ" represents a diameter of a so-called image circle. The diameter is obtainable, for example, based on the specification of a lens for projection and the specification of an apparatus on which the lens for projection is mounted.

The term "ray height" is considered by using the absolute value of a height from an optical axis.

The lens for projection of the present invention substantially consists of three lens groups of the negative lens group, the positive lens group and the positive lens group arranged in this order from the magnification side. Further, the reduction side is telecentric, and the structure of the most magnification-side lens and the third lens group is appropriately set. Therefore, a small F-number, a wide angle of view and excellent optical performance are achievable at the same time while the size of the lens for projection is small.

The projection-type display apparatus of the present invention includes the lens for projection of the present invention. Therefore, it is possible to make the size of the projection-type display apparatus small, and to achieve high brightness, and to provide a widening function. Further, the projection-type display apparatus can possess excellent projection performance to cope with recent high-definition light valves.

DESCRIPTION OF THE PREFERRED EMBODIMENTS

Hereinafter, embodiments of the present invention will be described in detail with reference to drawings. FIG. 1 through FIG. 7 are cross sections illustrating examples of the structure of a lens for projection according to embodiments of the present invention. FIG. 1 through FIG. 7 correspond to the lenses for projection in Examples 1 through 7, which will be described later, respectively. The basic structure of the examples illustrated in FIG. 1 through FIG. 7 is similar, and the illustration method of FIG. 1 through FIG. 7 is also similar. Therefore, the lens for projection according to the embodiments of the present invention will be described mainly with reference to FIG. 1.

Figure 1:
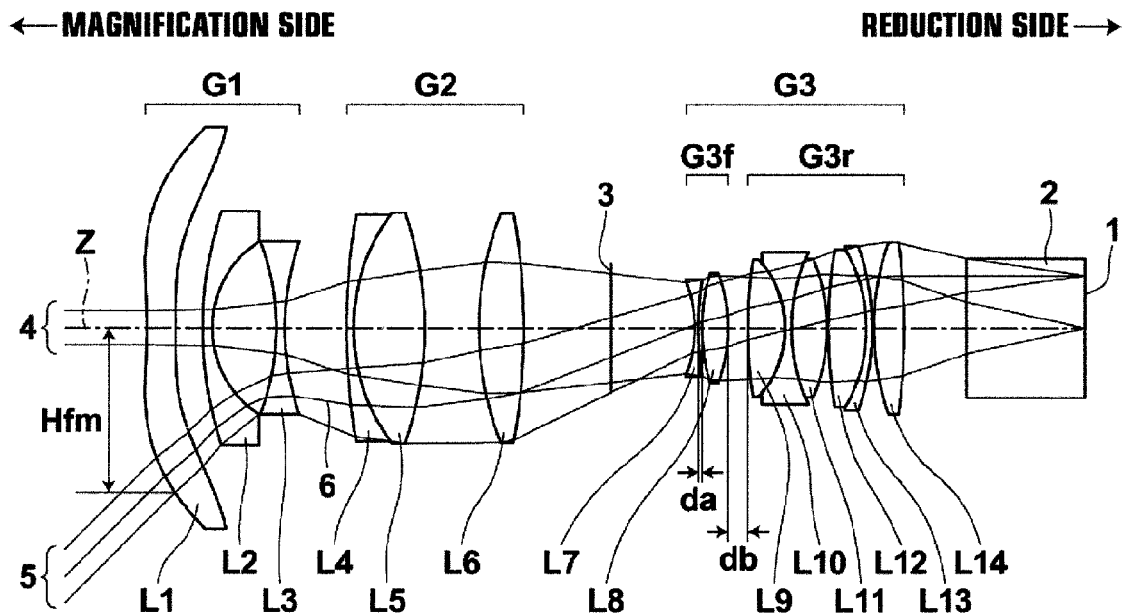
FIG. 1 is a cross section illustrating the lens structure of a lens for projection in Example 1 of the present invention and paths of rays.

FIG. 1 is a cross section illustrating the lens structure of the lens for projection according to an embodiment of the present invention. Axial rays 4 and off-axial rays 5 at a maximum angle of view are also illustrated.

This lens for projection is mounted, for example, on a projection-type display apparatus, and usable as a projection lens for projecting image information displayed on a light valve onto a screen. In FIG. 1, the left side of the diagram is the magnification side, and the right side of the diagram is the reduction side. Assuming a case of mounting the lens for projection on a projection-type display apparatus, FIG. 1 illustrates also a glass block 2, which is assumed to be a filter, a prism and the like used in a color combination unit or an illumination light separation unit, and an image display surface 1 of the light valve located on the reduction-side surface of the glass block 2.

In the projection-type display apparatus, rays to which image information has been given at the image display surface 1 enter the lens for projection through the glass block 2. Further, the rays are projected, by the lens for projection, onto a screen (not illustrated) arranged in the left-side direction of the paper surface.

FIG. 1 illustrates an example in which the position of the reduction-side surface of the glass block 2 and the position of the image display surface 1 are the same. However, the present invention is not necessarily limited to this example. Further, FIG. 1 illustrates only one image display surface 1. Alternatively, the projection-type display apparatus may be structured so that a full color image is displayable by separating rays from a light source into three primary colors by a color separation optical system, and by providing three light valves for the respective primary colors.

The lens for projection according to an embodiment of the present invention is a fixed-focus optical system. The lens for projection substantially consists of three lens groups of first lens group G1 having negative refractive power, second lens group G2 having positive refractive power, and third lens group G3 having positive refractive power in this order from a magnification side. Further, third lens group G3 consists of front group G3f having negative refractive power and rear group G3r having positive refractive power in this order from the magnification side with an air space therebetween. Further, the lens for projection is structured in such a manner that a reduction side of the entire system is telecentric.

The expression "a reduction side is telecentric" represents a state in which a bisector of an angle between the maximum ray on the upper side and the maximum ray on the lower side in a cross section of rays converging at an arbitrary point on a reduction-side image plane is nearly parallel to an optical axis. The expression does not mean only a perfect telecentric case, i.e., a case in which the bisector of the angle is perfectly parallel to the optical axis. The expression also means a case with some error (a case in which the bisector is slightly inclined with respect to the optical axis). Here, the case with some error (a case in which the bisector is slightly inclined with respect to the optical axis) means that the inclination of the bisector of the angle with respect to the optical axis is within the range of ±30. In FIG. 1, a ray coinciding with the bisector of the angle about the off-axial rays 5 at the maximum angle of view is illustrated as a virtual chief ray 6.

In the lens for projection of the present invention, a negative lens group, a positive lens group and a positive lens group are arranged in this order from the magnification side. The arrangement of the lens groups is advantageous to widening an angle of view, and to realize a telecentric optical system with a long back focus.

Further, third lens group G3 consists of negative front group G3f and positive rear group G3r in this order from the magnification side with an air space therebetween. Therefore, excellent correction of curvature of field is possible in front group G3f, and excellent correction of especially chromatic aberrations is possible in rear group G3r.

For example, in the example illustrated in FIG. 1, it may be considered that first lens group G1 consists of three lenses of lenses L1 through L3, and second lens group G2 consists of three lenses of lenses L4 through L6, and third lens group G3 consists of eight lenses of lenses L7 through L14. In third lens group G3, front group G3f consists of two lenses of lenses L7 and L8, and rear group G3r consists of six lenses of lenses L9 through L14. However, the number of a lens or lenses constituting each lens group in the lens for projection of the present invention is not necessarily limited to the example illustrated in FIG. 1 except for front group G3f.

Lens L1, which is the most magnification-side lens in the entire system of the lens for projection of the present invention, is an aspheric plastic lens, which is made of plastic material, and at least one surface of which is aspherical. When the most magnification-side lens has an aspherical surface, excellent correction of distortion is possible. Since the most magnification-side lens, the lens diameter of which tends to be the largest in the entire system, is made of plastic material, reduction in weight and cost is possible.

In the example illustrated in FIG. 1, both of the surfaces of lens L1 are aspherical, and all of the other surfaces are spherical. When an optical system with a small F-number and a wide angle of view is tried to be achieved, if a surface or surfaces to be made aspherical are appropriately selected in this manner, it is possible to minimize the number of an aspheric lens or lenses. Consequently, it is possible to suppress cost.

It is desirable that first lens group G1 consists of lens L1, which is an aspheric lens, and lenses L2 and L3, which are two negative lenses, as in the example illustrated in FIG. 1. When first lens group G1 is structured in this manner, it is possible to structure first lens group G1 with a small number of lenses, and that is cost-advantageous.

For example, lens L1 may be a negative meniscus lens with its convex surface facing the reduction side in a paraxial region. Lens L2 may be a negative meniscus lens with its convex surface facing the magnification side. Lens L3 may be a biconcave lens. When lens L1 is an aspheric lens, and lens L1 through L3 are shaped as described, that is advantageous to achieving an optical system with a small F-number and a wide angle of view while securing necessary negative refractive for first lens group G1 by using a small number of lenses.

It is desirable that second lens group G2 consists of a cemented lens having positive refractive power and consisting of two lenses cemented together, and a single lens having positive refractive power in this order from the magnification side, and that one of the two lenses of the cemented lens is a positive lens, and the other one of the two lenses of the cemented lens is a negative lens. In other words, when second lens group G2 consists of two sets of an element or elements, and each of the two sets having positive refractive power, excellent correction of a spherical aberration is possible. Further, the cemented lens in second lens group G2 can excellently correct a lateral chromatic aberration.

Further, it is desirable that both of the cemented lens in second lens group G2 and the positive single lens in second lens group G2 located toward the reduction side of the cemented lens have biconvex shapes. Specifically, in the example illustrated in FIG. 1, it is desirable that all of the magnification-side surface of lens L4, the reduction-side surface of lens L5 and both surfaces of lens L6 are convex. When the surfaces are shaped in this manner, each of the lens surfaces appropriately shares positive refractive power necessary for second lens group G2. Therefore, it is possible to excellently correct aberrations without making the lens diameter of second lens group G2 too large.

Here, the cemented lens in second lens group G2 may be a negative lens and a positive lens cemented together in this order from the magnification side. Alternatively, the cemented lens may be a positive lens and a negative lens cemented together in this order from the magnification side.

As in the example illustrated in FIG. 1, front group G3f in third lens group G3 consists of lens L7, which is a negative single lens, and lens L8, which is a positive single lens, in this order from the magnification side. Further, front group G3f is structured in such a manner that air space da between lens L7 and lens L8 is narrower than air space db between front group G3f and rear group G3r. When front group G3f is structured in this manner, it is possible to realize an optical system with a small F-number in which curvature of field has been excellently corrected.

To further increase the aforementioned effect about front group G3f, it is desirable that the negative single lens and the positive single lens in front group G3f are a biconcave lens and a biconvex lens, respectively.

Rear group G3r in third lens group G3 may consist of, for example, a biconvex single lens, a cemented lens of a biconcave lens and a biconvex lens, a cemented lens of a biconvex lens and a negative meniscus lens with its convex surface facing the reduction side, and a biconvex lens in this order from the magnification side. Such structure of rear group G3r is advantageous to correction of a lateral chromatic aberration.

As in the example illustrated in FIG. 1, an aperture 3 consisting of a mask or the like may be arranged between second lens group G2 and third lens group G3. It is possible to make telecentricity on the reduction side excellent by blocking unwanted off-axial rays by the aperture 3. The aperture 3 illustrated in FIG. 1 does not represent the shape nor the size of the aperture 3, but a position on optical axis Z.

Further, the lens for projection of the present invention is structured in such a manner to satisfy the following conditional formula (1):

$$-0.7 < fFG3/f < 0.7 \qquad (1),$$ where fFG3: a front focus of the third lens group, and
f: a focal length of an entire system when projection distance is infinity.

When an intersection of the aforementioned virtual chief ray 6 and optical axis Z is regarded as a position of a virtual stop, if the lens for projection of the present invention, in which the reduction side is telecentric, satisfies conditional formula (1), front group G3f is located at the position of the virtual stop or in the vicinity thereof. When front group G3f consisting of a negative single lens and a positive single lens arranged with a relatively narrow air space therebetween is located at such a position at which rays are dense, it is possible to excellently correct curvature of field in an optical system with a small F-number.

Further, if a cemented lens is arranged at the position at which rays are dense, when the lens for projection is used together with a light source with high output power, the qualities of adhesive may greatly change and deteriorate due to strong light. Therefore, there is a risk of lowering lens performance. When front group G3f consists of only single lenses, and conditional formula (1) is satisfied, it is possible to prevent occurrence of such a problem.

It is more desirable that the following conditional formula (1') is satisfied to more excellently correct curvature of field in an optical system with a small F-number:

$$-0.5 < fFG3/f < 0.5 \qquad (1').$$

Further, in the lens for projection of the present invention, it is desirable that the following conditional formula (2) is satisfied:

$$-0.3 < f/fG23 < 0 \qquad (2),$$ where f: a focal length of an entire system when projection distance is infinity, and
fG23: a combined focal length of the second lens group and the third lens group.

If the value is lower than or equal to the lower limit of conditional formula (2), the refractive power of first lens group G1 becomes too strong. Therefore, it becomes difficult to excellently correct curvature of field while securing a small F-number. Or, if curvature of field is tried to be excellently corrected while a small F-number is secured, the number of lenses in first lens group G1 increases, and that contradicts reduction in size and weight.

Here, when f/fG23, which is a value corresponding to conditional formula (2), is 0, a combined optical system of second lens group G2 and third lens group G3 is an afocal system. When the lens for projection of the present invention satisfies conditional formula (2), a combined optical system of second lens group G2 and third lens group G3 has negative refractive power, and a chief ray 6 of off-axial rays traveling from second lens group G2 to first lens group G1 approaches optical axis Z, as illustrated in FIG. 1. Therefore, it is possible to make size, especially, in the diameter direction of first lens group G1 compact. At the same time, axial rays 4 travel from second lens group G2 to first lens group G1 also while the axial rays 4 are strongly converged. Therefore, it is possible to narrow a distance between first lens group G1 and second lens group G2 in an appropriate manner. Hence, it is possible to prevent the total length from becoming too long.

If the value is higher than or equal to the upper limit of conditional formula (2), it becomes difficult to make the structure of the lens system with a small F-number, a wide angle of view and an appropriately long back focus compact both in the direction of the optical axis and in the diameter direction.

Therefore, it is more desirable that the following conditional formula (2') is satisfied to more excellently correct curvature of field while the size and the weight are reduced:

$$-0.2 < f/fG23 < 0 \quad (2').$$

Further, in the lens for projection of the present invention, it is desirable that the following conditional formula (3) is satisfied:

$$da/f < 0.4 \quad (3), \text{ where}$$

da: an air space on an optical axis between the negative lens and the positive lens in the front group, and f: a focal length of an entire system when projection distance is infinity.

If the value is higher than or equal to the upper limit of conditional formula (3), an air space between lens L7 and lens L8 constituting front group G3f becomes too wide, and excellent correction of curvature of field becomes difficult.

Therefore, it is more desirable that the following conditional formula (3') is satisfied to more excellently correct curvature of field:

$$da/f < 0.3 \quad (3').$$

Further, in the lens for projection of the present invention, it is desirable that the following conditional formula (4) is satisfied:

$$1.0 < fG2/fG3 < 1.4 \quad (4), \text{ where}$$

fG2: a focal length of the second lens group, and fG3: a focal length of the third lens group.

If the value is lower than or equal to the lower limit of conditional formula (4), the total length of the lens system becomes too long. If the value is higher than or equal to the upper limit of conditional formula (4), the diameters of lenses located toward the magnification side of second lens group G2 become large.

Therefore, it is more desirable that the following conditional formula (4') is satisfied to further reduce the lens diameter:

$$1.0 < fG2/fG3 < 1.2 \quad (4').$$

Further, in the lens for projection of the present invention, it is desirable that the following conditional formula (5) is satisfied:

$$0.55 < (Hsm - Im\phi/2)/Hsj \quad (5), \text{ where}$$

Hsm: a maximum ray height at a most reduction-side lens surface,

Imφ: a maximum effective image circle diameter on the reduction side, and

Hsj: a maximum ray height of axial rays at the most reduction-side lens surface.

Figure 8:
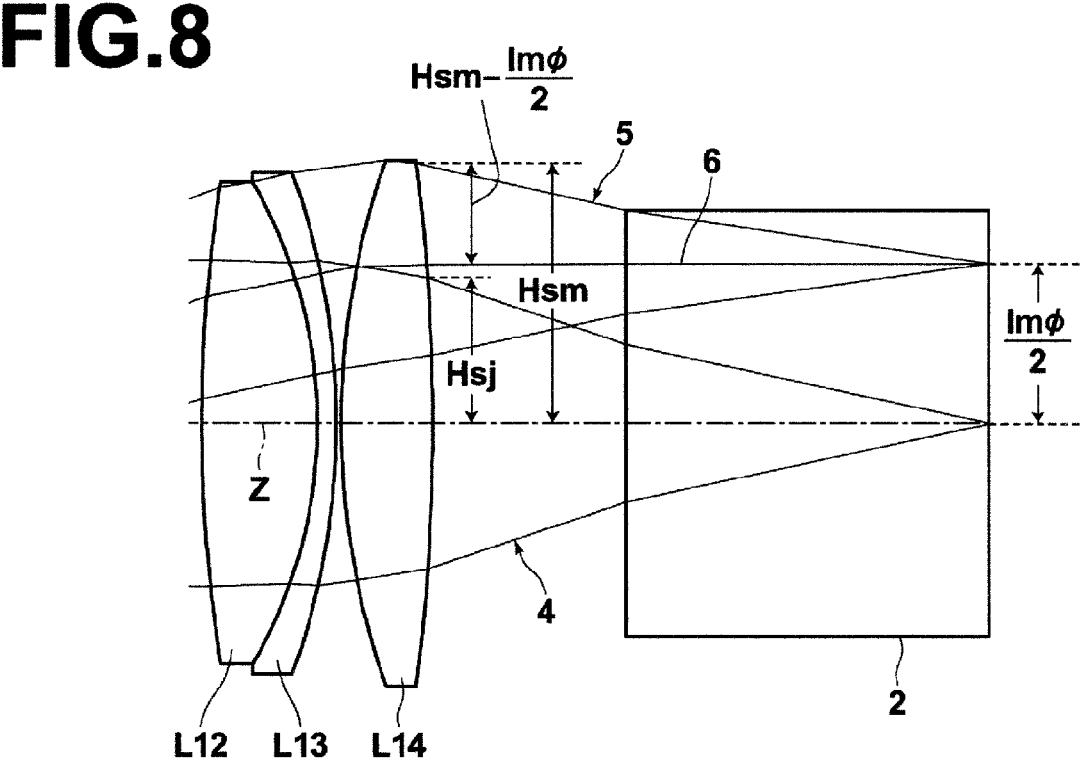
FIG. 8 is a partially enlarged diagram for explaining conditional formula (5)

FIG. 8 is a partially enlarged diagram of the structure example illustrated in FIG. 1, and lens L12 through the glass block 2 are illustrated. Each ray height and a maximum effective image circle radius related to conditional formula (5) are illustrated. As FIG. 8 shows, (Hsm—Imφ/2) and Hsj schematically correspond to the radius of the off-axial rays 5 at the reduction-side surface of lens L14 and the radius of the axial rays 4, respectively. When conditional formula (5) is satisfied, it is possible to secure a peripheral light amount necessary for practical use.

Further, it is desirable that the following conditional formula (5') is satisfied:

$$0.60 < (Hsm - Im\phi/2)/Hsj < 1.00 \quad (5').$$

When the lower limit of conditional formula (5') is satisfied, it is possible to secure a more desirable peripheral light amount. If the value is higher than or equal to the upper limit of conditional formula (5'), the telecentricity deteriorates.

Further, in the lens for projection of the present invention, it is desirable that the following conditional formula (6) is satisfied:

$$|Hfm/Im\phi| < 2.0 \quad (6), \text{ where}$$

Hfm: a maximum ray height at a most magnification-side lens surface, and

Imφ: a maximum effective image circle diameter on the reduction side.

As illustrated in FIG. 1, Hfm is a ray height of a farthest ray from the optical axis among rays included in the off-axial rays 5 at the maximum angle of view at the magnification-side surface of lens L1. If the value is higher than or equal to the upper limit of conditional formula (6), the diameter of most magnification-side lens L1 becomes large.

Therefore, it is more desirable that the following conditional formula (6') is satisfied to further reduce the lens diameter:

$$|Hfm/Im\phi| < 1.8 \quad (6').$$

Further, in the lens for projection of the present invention, it is desirable that the following conditional formula (7) is satisfied:

$$-1.5 < fG1/f < -0.7 \quad (7), \text{ where}$$

fG1: a focal length of the first lens group, and f: a focal length of an entire system when projection distance is infinity.

If the value is lower than or equal to the lower limit of conditional formula (7), it becomes difficult to secure a back focus with an appropriate length. If the value is higher than or equal to the upper limit of conditional formula (7), it becomes difficult to excellently correct curvature of field while securing a small F-number. Or, if curvature of field is tried to be excellently corrected while a small F-number is secured, the number of lenses in first lens group G1 increases, and that contradicts reduction in size and weight.

Therefore, it is more desirable that the following conditional formula (7') is satisfied to more easily secure a back focus, and to more excellently correct curvature of field while the size and the weight are reduced:

$$-1.3 < fG1/f < -1.0 \quad (7').$$

Further, in the lens for projection of the present invention, it is desirable that the following conditional formula (8) is satisfied:

$$1.5 < fG2/f < 6.0 \quad (8), \text{ where}$$

fG2: a focal length of the second lens group, and f: a focal length of an entire system when projection distance is infinity.

If the value is lower than or equal to the lower limit of conditional formula (8), refractive power of first lens group G1 becomes too strong, and it becomes difficult to excellently correct curvature of field while securing a small F-number. Or, if curvature of field is tried to be excellently corrected while a small F-number is secured, the number of lenses in first lens group G1 increases, and that contradicts reduction in size and weight. If the value is higher than or equal to the upper limit of conditional formula (8), the diameters of lenses located toward the magnification side of second lens group G2 become large.

Therefore, it is more desirable that the following conditional formula (8') is satisfied to more excellently correct curvature of field while the size and the weight are reduced:

$$2.3 < fG2/f < 4.5 \quad (8').$$

Further, in the lens for projection of the present invention, it is desirable that the following conditional formula (9) is satisfied:

$$fG3f/f < -3.0 \qquad (9),\text{ where}$$

fG3f: a focal length of the front group in the third lens group, and f: a focal length of an entire system when projection distance is infinity.

If the value is higher than or equal to the upper limit of conditional formula (9), the diameters of lenses located toward the magnification side of second lens group G2 become large.

Further, it is desirable that the following conditional formula (9') is satisfied:

$$-20.0 < fG3f/f < -5.0 \qquad (9').$$

If the value is lower than or equal to the lower limit of conditional formula (9'), the power balance of the entire system deteriorates, and it becomes difficult to excellently correct curvature of field while securing a small F-number. When the upper limit of conditional formula (9') is satisfied, it is possible to further suppress an increase in the diameters of lenses located toward the magnification side of second lens group G2.

Further, in the lens for projection of the present invention, it is desirable that the following conditional formula (10) is satisfied:

$$2.00 < Bf/f \qquad (10),\text{ where}$$

Bf: a back focus of the entire system, and f: a focal length of an entire system when projection distance is infinity.

If the value is lower than or equal to the lower limit of conditional formula (10), it becomes difficult to secure an appropriate space for inserting a beam splitter, a glass block as a color combination means, such as a cross-dichroic prism and a TIR prism, and the like on the reduction side of the lens system.

Further, it is desirable that the following conditional formula (10'):

$$2.40 < Bf/f < 4.00 \qquad (10').$$

When the lower limit of conditional formula (10') is satisfied, it is possible to more easily secure a space for inserting a glass block or the like. If the value is higher than or equal to the upper limit of conditional formula (10'), the total length becomes too long.

Further, it is desirable that the lens for projection of the present invention satisfies the following conditional formula (11). When conditional formula (11) is not satisfied, it is impossible to realize an optical system with a small F-number as requested in recent years. It is more desirable that the following conditional formula (11') is satisfied to realize an optical system with a smaller F-number:

$$FNo < 2.00 \qquad (11);\text{ and}$$

$$FNo < 1.85 \qquad (11'),\text{ where}$$

FNo: an F-number.

Further, it is desirable that the lens for projection of the present invention satisfies the following conditional formula (12). When conditional formula (12) is not satisfied, it is impossible to cope with a request for use with a wide angle of view. It is more desirable that the following conditional formula (12') is satisfied to make the lens for projection more appropriate for use with a wide angle of view:

$$70° < 2\omega \qquad (12);\text{ and}$$

$$75° < 2\omega \qquad (12'),\text{ where}$$

2ω: a maximum full angle of view.

It is desirable that the lens for projection of the present invention is structured to perform focusing by moving at least one lens of lenses in first lens group G1 and second lens group G2 except lens L1, which is the most magnification-side lens. Specifically, in the example illustrated in FIG. 1, it is desirable that the lens for projection is structured to perform focusing by moving at least one of five lenses of lens L2 through L6. Since lens L1, which has the largest diameter, is fixed during focusing, it is possible to reduce a load on a drive mechanism. Further, it is possible to make the total length of the optical system constant even during focusing.

When plural lenses are moved during focusing, they may be moved together in an integrated manner, or independently from each other. A lens or lenses used for focusing may be a lens or lenses only in first lens group G1, or a lens or lenses only in second lens group G2. Alternatively, a lens or lenses in both of first lens group G1 and second lens group G2 may be used. Further, a lens in each lens group may be used, or plural lenses in each lens group may be used. Further, a lens or plural lenses used in focusing may be selected based on a fluctuation amount of a projection distance. When a fluctuation amount of projection distance is large, it is desirable to use lenses in both of first lens group G1 and second lens group G2.

When at least a part of lenses included in first lens group G1 is moved in the direction of the optical axis during focusing, it is possible to more effectively suppress a fluctuation of distortion. When at least a part of lenses included in second lens group G2 is moved in the direction of the optical axis during focusing, it is possible to more effectively suppress a fluctuation of curvature of field. When lenses in first lens group G1 and second lens group G2 are moved in the direction of the optical axis, it is possible to effectively suppress a fluctuation of distortion and a fluctuation of curvature of field.

Further, it is desirable that distortion of a lens for projection, as an object of the present invention, is suppressed to about 2% or less. It is more desirable that distortion is suppressed to 0.6% or less. When distortion is 0.6% or less, the lens for projection is excellently usable in use like division projection, in which a projection display is divided into plural sections, and images in the respective divided display sections are projected at the same time from a projection-type display apparatus.

Further, it is desirable that the aforementioned desirable structures are appropriately and optionally adopted based on what is requested for the lens for projection.

Figure 9:
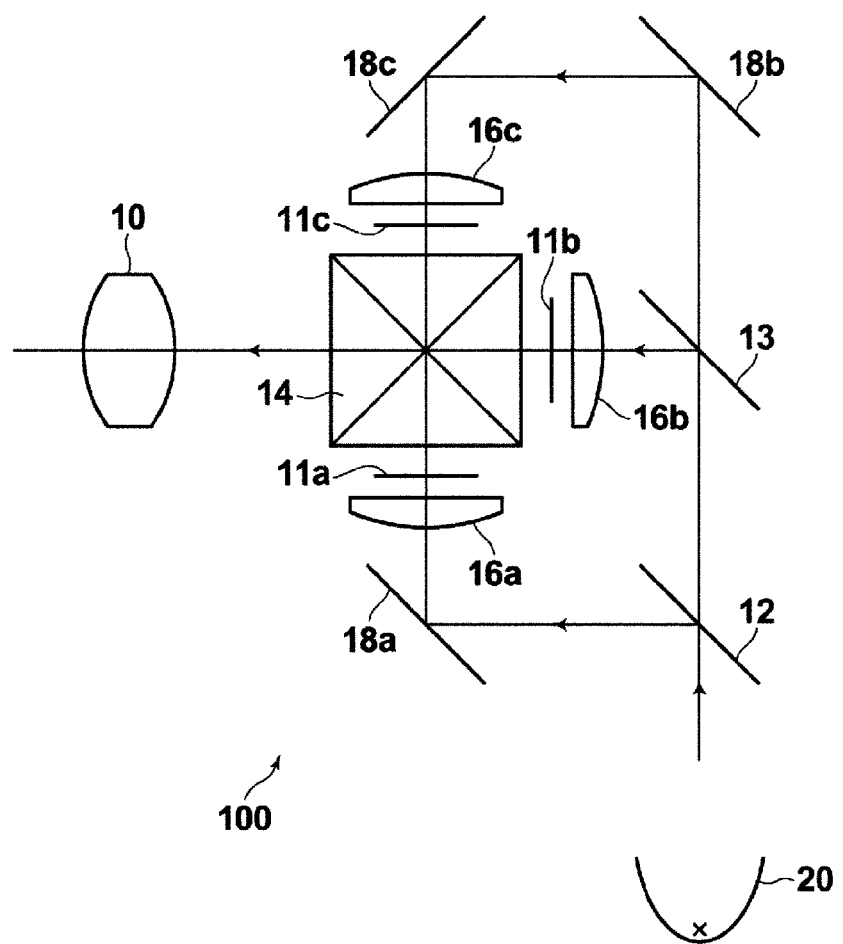
FIG. 9 is a schematic diagram illustrating the structure of a projection-type display apparatus according to an embodiment of the present invention.

Next, an embodiment of a projection-type display apparatus of the present invention will be described by using FIG. 9. FIG. 9 is a schematic diagram illustrating the structure of a projection-type display apparatus according to an embodiment of the present invention.

A projection-type display apparatus 100 illustrated in FIG. 9 includes a lens 10 for projection according to an embodiment of the present invention, a light source 20, transmission-type display devices 11a through 11c, as light valves corresponding to respective colors, dichroic mirrors 12 and 13 for color separation, a cross-dichroic prism 14 for color combination, condenser lenses 16a through 16c, and total reflection mirrors 18a through 18c for deflecting an optical path. In FIG. 9, the lens 10 for projection is schematically illustrated. An integrator is arranged between the light source 20 and the dichroic mirror 12. However, the integrator is not illustrated in FIG. 9.

White light from the light source 20 is separated into rays of three colors (G light, B light and R light) by the dichroic mirrors 12 and 13. After then, the rays of respective colors enter transmission-type display devices 11a through 11c corresponding to the rays of respective colors through condenser lenses 16a through 16c, respectively, and are optically modulated. After the colors are combined by the cross-dichroic prism 14, the light enters the lens 10 for projection. The lens 10 for projection projects an optical image of light that has been optically modulated by the transmission-type display devices 11a through 11c onto a screen, which is not illustrated.

As the transmission-type display devices 11a through 11c, for example, transmission-type liquid crystal display devices, and the like may be used. FIG. 9 illustrates an example in which the transmission-type display devices are used as light valves. However, the light valve provided in the projection-type display apparatus of the present invention is not limited to this, and other light modulation means, such as a reflection-type liquid crystal device or a DMD, may be used.

Next, specific examples of the lens for projection of the present invention will be described.

EXAMPLE 1

A lens structure diagram of a lens for projection in Example 1 and paths of rays are illustrated in FIG. 1. Since FIG. 1 has been described already, repetition of explanation will be omitted. FIG. 1 illustrates structure when projection distance is infinity.

The lens for projection in Example 1 has three group structure, in which first lens group G1 having negative refractive power, second lens group G2 having positive refractive power, and third lens group G3 having positive refractive power are arranged in this order from the magnification side. Further, the reduction side is telecentric. A glass block 2, which is assumed to be various kinds of filter, such as an infrared-ray-cut filter and a low-pass filter, a color combination prism and the like, is arranged toward the reduction side of third lens group G3. Further, an image display surface 1 of the light valve is arranged in contact with the reduction-side surface of the glass block 2. Further, an aperture 3 consisting of a mask or the like for blocking unwanted off-axial rays is arranged between second lens group G2 and third lens group G3.

First lens group G1 consists of lens L1, which is a negative meniscus lens with its convex surface facing the reduction side in a paraxial region, lens L2, which is a negative meniscus lens with its convex surface facing the magnification side, and lens L3, which is a biconcave lens, arranged in this order from the magnification side.

Second lens group G2 consists of lens L4, which is a negative meniscus lens with its convex surface facing the magnification side, lens L5, which is a biconvex lens, and lens L6, which is a biconvex lens, arranged in this order from the magnification side. Further, lens L4 and lens L5 are cemented together.

Third lens group G3 consists of front group G3f having negative refractive power and rear group G3r having positive refractive power arranged in this order from the magnification side. Front group G3f consists of lens L7, which is a biconcave lens, and lens L8, which is a biconvex lens, arranged in this order from the magnification side. Further, lens L7 and lens L8 are arranged with an air space therebetween.

Rear group G3r consists of lens L9, which is a biconvex lens, lens L10, which is a biconcave lens, lens L11, which is a biconvex lens, lens L12, which is a biconvex lens, lens L13, which is a negative meniscus lens with its convex surface facing the reduction side, and lens L14, which is a biconvex lens, arranged in this order from the magnification side. Further, lens L10 and lens L11 are cemented together, and lens L12 and lens L13 are cemented together.

In the lens for projection in Example 1, both surfaces of lens L1 are aspherical, and all of the other surfaces are spherical. Further, lens L1 is made of plastic material.

Table 1 through Table 3 show various kinds of data about the lens for projection in Example 1. The numerical values shown in Table 1 through Table 3 are normalized values so that the focal length of the entire system when projection distance is infinity is 1. Further, numerical values in the tables are rounded at predetermined digits.

Table 1 shows basic lens data about the lens for projection in Example 1. In the basic lens data, column Si shows the surface number of the i-th surface (i=1, 2, 3, . . . ) when the magnification-side surface of the most magnification-side composition element is the first surface, and surface numbers are assigned to surfaces of composition elements to sequentially increase toward the reduction side. Column Ri shows the curvature radius of the i-th surface, and column Di shows a distance between the i-th surface and the (i+1)th surface on optical axis Z. Column Ndj shows the refractive index of the j-th composition element (j=1, 2, 3, . . . ) for d-line (wavelength is 587.6 nm). The most magnification-side composition element is the first composition element, and the number j sequentially increases toward the reduction side. The column vdj shows the Abbe number of the j-th composition element for d-line.

Here, the sign of a curvature radius is positive when a surface shape is convex toward the magnification side, and negative when a surface shape is convex toward the reduction side. The basic lens data show data including the glass block 2 and the aperture 3. Surfaces with the surface numbers of 1, 2 are aspherical surfaces, and mark * is attached to these surface numbers. The column of curvature radius shows the numerical values of paraxial curvature radii for aspherical surfaces.

The lens for projection in Example 1 is structured in such a manner that focusing is performed by moving a set of lenses L2, L3 and a set of lenses L4, L5 independently from each other. A distance between lens L1 and lens L2, a distance between lens L3 and lens L4, and a distance between lens L5 and lens L6 are variable during focusing. In the column of surface distances, the terms "DD[2]", "DD[6]" and "DD[9]" are written in rows corresponding to these variable surface distances, respectively. In other words, when a distance between the i-th surface and the (i+1)th surface is a variable surface distance, the term "DD[i]" is written.

Table 2 shows the value of each of the variable surface distances of the lens for projection in Example 1 when projection distance is infinity and finite distance. Here, 123.92 is used as the value of projection distance when projection distance is finite distance. The focal length of the entire system at this projection distance is 1.002, and an F-number is 1.70, and a full angle of view is 84.2°. A focal length, an F-number and a full angle of view when projection distance is infinity are shown in Table 22 and Table 23 together with those of the other examples, which will be presented later.

Table 3 shows aspherical surface coefficients of surfaces with surface numbers of 1 and 2. In the numerical values of the aspherical surface coefficients in Table 3, "E−n" (n: integer) means "x10$^{-n}$". The aspherical surface coefficients are values of coefficients K, Am (m=3, 4, 5, . . . ) in an aspherical surface equation represented by the following expression:

$$Zd = C \cdot h^2 / \{1 + (1 - K \cdot C^2 \cdot h^2)^{1/2}\} + \Sigma Am \cdot h^m, \text{ where}$$

Zd: the depth of an aspherical surface (the length of a perpendicular from a point on the aspherical surface at height h to a flat plane that contacts with the vertex of the aspherical surface and is perpendicular to the optical axis), h: a height (the length from the optical axis to the lens surface), C: a paraxial curvature, and K, Am: aspherical surface coefficients (m=3, 4, 5, . . . ).

TABLE 1

EXAMPLE 1 BASIC LENS DATA

| Si | Ri | Di | Ndj | νdj |
|---|---|---|---|---|
| *1 | −5.5311 | 0.5422 | 1.49100 | 57.58 |
| *2 | −32.4914 | DD[2] | | |
| 3 | 6.0708 | 0.1782 | 1.61800 | 63.33 |
| 4 | 1.6963 | 1.2148 | | |
| 5 | −3.8201 | 0.1720 | 1.77250 | 49.60 |
| 6 | 4.3042 | DD[6] | | |
| 7 | 10.8345 | 0.1324 | 1.75520 | 27.51 |
| 8 | 3.1059 | 1.3386 | 1.70154 | 41.24 |
| 9 | −5.6350 | DD[9] | | |
| 10 | 4.8471 | 0.8598 | 1.62041 | 60.29 |
| 11 | −10.3419 | 1.6490 | | |
| 12 | ∞ | 1.5917 | | |
| 13 | −1.9706 | 0.0774 | 1.77250 | 49.60 |
| 14 | 5.0543 | 0.0662 | | |
| 15 | 3.0076 | 0.4953 | 1.56732 | 42.82 |
| 16 | −2.5364 | 0.3801 | | |
| 17 | 7.4621 | 0.6971 | 1.48749 | 70.23 |
| 18 | −1.6557 | 0.0115 | | |
| 19 | −1.6244 | 0.1170 | 1.77250 | 49.60 |
| 20 | 2.8965 | 0.6659 | 1.49700 | 81.54 |
| 21 | −2.9107 | 0.0310 | | |
| 22 | 8.0375 | 0.7134 | 1.49700 | 81.54 |
| 23 | −2.5409 | 0.1162 | 1.84666 | 23.78 |
| 24 | −3.8526 | 0.0309 | | |
| 25 | 4.1028 | 0.5720 | 1.58913 | 61.14 |
| 26 | −10.8189 | 1.1967 | | |
| 27 | ∞ | 2.2461 | 1.51633 | 64.14 |
| 28 | ∞ | | | |

TABLE 2

EXAMPLE 1 VARIABLE SURFACE DISTANCE

| PROJECTION DISTANCE | INFINITY | 123.92 |
|---|---|---|
| DD[2] | 0.5130 | 0.5337 |
| DD[6] | 1.1666 | 1.1814 |
| DD[9] | 1.0320 | 0.9964 |

TABLE 3

EXAMPLE 1 ASPHERICAL SURFACE COEFFICIENT

| SURFACE NUMBER | 1 | 2 |
|---|---|---|
| K | 8.00000E−01 | −2.79783E+00 |
| A3 | 2.95993E−02 | 3.55802E−02 |
| A4 | 3.74615E−02 | 1.91176E−02 |
| A5 | −1.52541E−02 | −2.95152E−03 |
| A6 | 1.11742E−03 | −1.49329E−03 |
| A7 | 4.54349E−04 | −2.34012E−04 |
| A8 | −3.14255E−05 | 2.50886E−05 |
| A9 | −1.27594E−05 | 2.46782E−05 |
| A10 | −1.02978E−07 | 4.20409E−06 |
| A11 | 1.82386E−07 | 8.03895E−07 |
| A12 | 1.39431E−08 | −5.64113E−07 |

Figure 10:
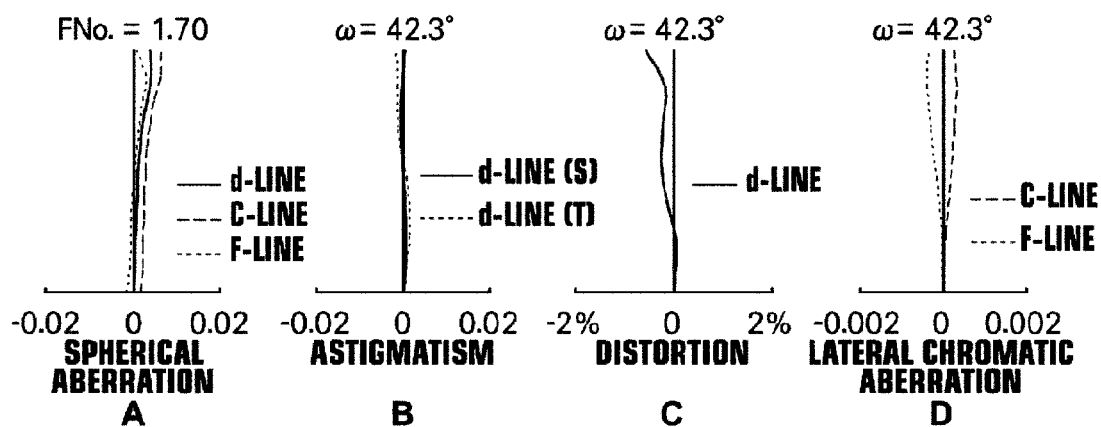
FIG. 10, Sections A through H are aberration diagrams of the lens for projection in Example 1 of the present invention.
Figure 10:
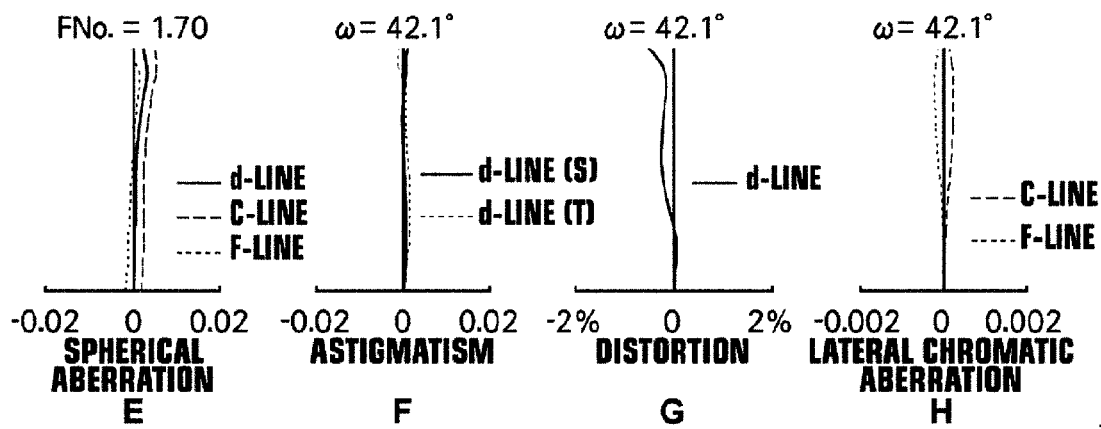

FIG. 10, Sections A through D illustrate aberration diagrams of a spherical aberration, astigmatism, distortion, and a lateral chromatic aberration of the lens for projection in Example 1, respectively, when projection distance is infinity. FIG. 10, Sections E through H illustrate aberration diagrams of a spherical aberration, astigmatism, distortion, and a lateral chromatic aberration of the lens for projection in Example 1, respectively, when projection distance is 123.92. Aberration diagrams of FIG. 10, Sections A through H illustrate aberrations when values are normalized so that the focal length of the entire system when projection distance is infinity is 1.

Each of the aberration diagrams in FIG. 10, Sections A through H is based on d-line. The diagrams of the spherical aberration illustrate aberrations also for F-line (wavelength is 486.1 nm) and C-line (wavelength is 656.3 nm). The diagrams of the lateral chromatic aberration illustrate aberrations for F-line and C-line. In the diagrams of the astigmatism, aberrations for the sagittal direction are indicated by solid lines, and aberrations for the tangential direction are indicated by broken lines. The signs of (S) and (T) are written to explain the line types. In the diagrams of the spherical aberration, the sign "FNo." on the top of the vertical axis means an F-number. In the other aberration diagrams, the sign of "ω" on the top of the vertical axis means a half angle of view.

The signs, meanings and description methods of various data, the feature that values are normalized so that the focal length of the entire system when projection distance is infinity is 1, and the like, which have been described in the explanation of Example 1, are similar also in the following Examples 2 through 7, unless specifically otherwise mentioned. However, values when projection distance is finite distance are different in each example, and the values are written in the table showing variable surface distances and aberration diagrams of each example in a similar manner to those of Example 1.

EXAMPLE 2

Figure 2:
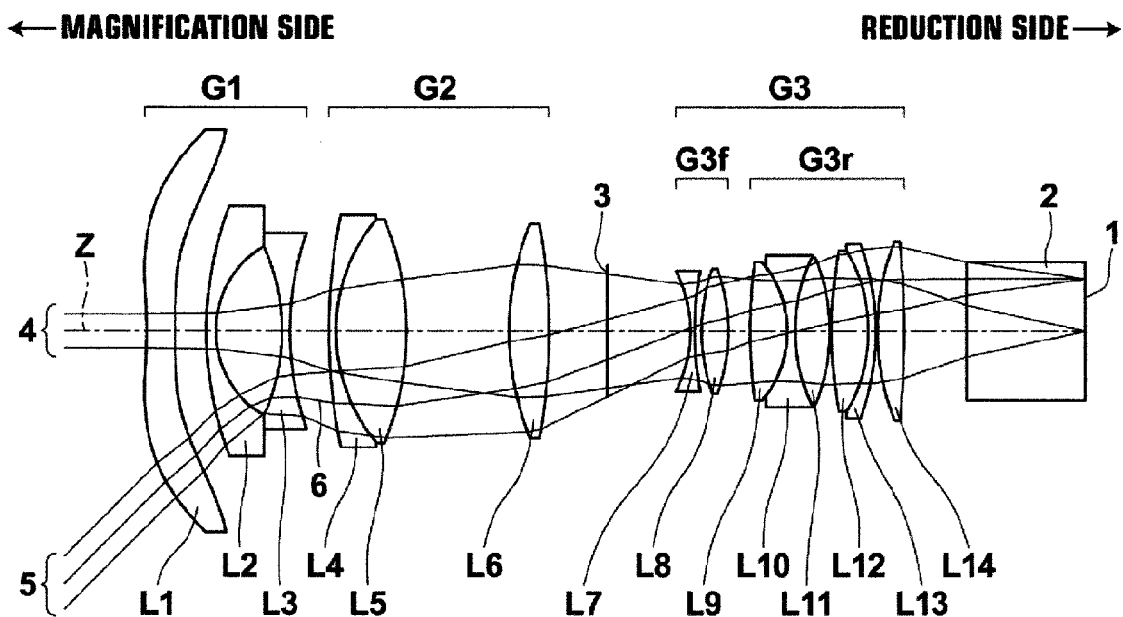
FIG. 2 is a cross section illustrating the lens structure of a lens for projection in Example 2 of the present invention and paths of rays.
Figure 11:
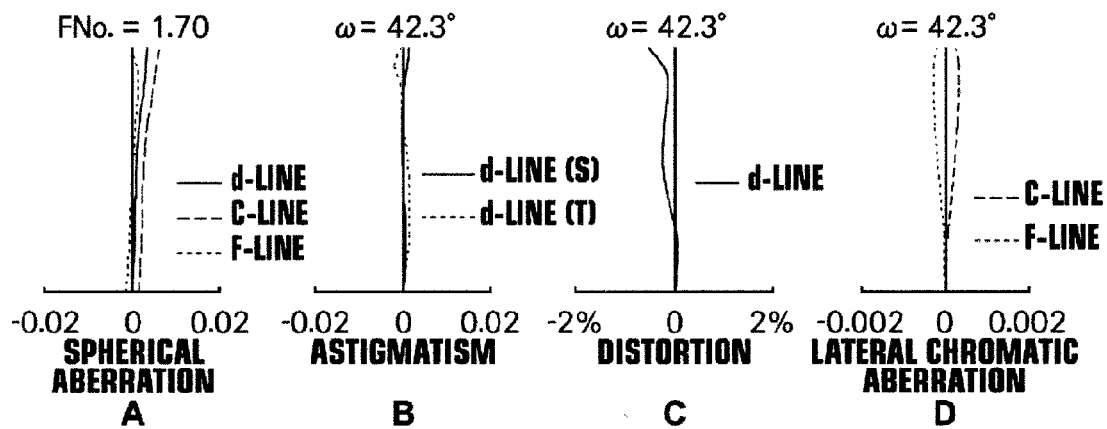
FIG. 11, Sections A through H are aberration diagrams of the lens for projection in Example 2 of the present invention.
Figure 11:
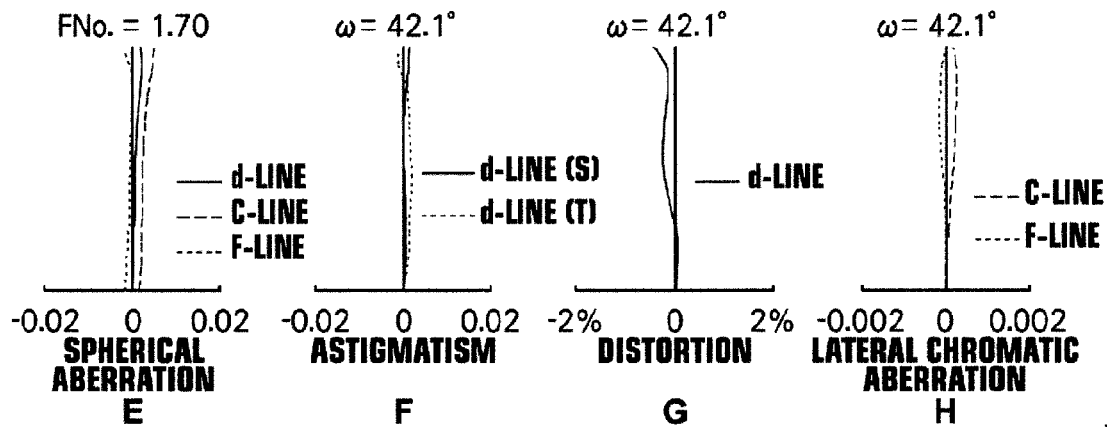

FIG. 2 illustrates the lens structure of a lens for projection in Example 2 and paths of rays. The lens for projection in Example 2 has almost similar structure to the lens for projection in Example 1. Further, lenses that move during focusing are also similar. Table 4, Table 5 and Table 6 show basic lens data, variable surface distances, and aspherical surface coefficients, respectively, about the lens for projection in Example 2. FIG. 11, Sections A through H illustrate aberration diagrams of the lens for projection in Example 2. In the data about Example 2, projection distance is 123.93 when projection distance is finite distance. At this projection distance, the focal length of the entire system is 1.002, and an F-number is 1.70, and a full angle of view is 84.2°.

TABLE 4

EXAMPLE 2 BASIC LENS DATA

| Si | Ri | Di | Ndj | νdj |
|---|---|---|---|---|
| *1 | −5.5313 | 0.5422 | 1.49100 | 57.58 |
| *2 | −32.4926 | DD[2] | | |
| 3 | 5.6888 | 0.1782 | 1.61800 | 63.33 |
| 4 | 1.6301 | 1.2614 | | |
| 5 | −3.2295 | 0.1492 | 1.77250 | 49.60 |
| 6 | 4.8073 | DD[6] | | |
| 7 | 9.0892 | 0.1367 | 1.75520 | 27.51 |
| 8 | 2.8497 | 1.3279 | 1.70154 | 41.24 |
| 9 | −4.6773 | DD[9] | | |
| 10 | 4.6246 | 0.7603 | 1.62041 | 60.29 |
| 11 | −9.2442 | 1.0917 | | |
| 12 | ∞ | 1.5730 | | |

TABLE 4-continued

EXAMPLE 2 BASIC LENS DATA

| Si | Ri | Di | Ndj | νdj |
|---|---|---|---|---|
| 13 | −2.1123 | 0.0929 | 1.77250 | 49.60 |
| 14 | 5.2100 | 0.1295 | | |
| 15 | 2.9854 | 0.5059 | 1.56732 | 42.82 |
| 16 | −2.8702 | 0.4191 | | |
| 17 | 8.8617 | 0.6972 | 1.48749 | 70.23 |
| 18 | −1.7401 | 0.0115 | | |
| 19 | −1.7030 | 0.1403 | 1.77250 | 49.60 |
| 20 | 2.7769 | 0.6552 | 1.49700 | 81.54 |
| 21 | −3.0533 | 0.0310 | | |
| 22 | 7.0838 | 0.6949 | 1.49700 | 81.54 |
| 23 | −2.5543 | 0.1398 | 1.84666 | 23.78 |
| 24 | −4.0710 | 0.0310 | | |
| 25 | 3.8327 | 0.5062 | 1.58913 | 61.14 |
| 26 | −15.2348 | 1.1958 | | |
| 27 | ∞ | 2.2462 | 1.51633 | 64.14 |
| 28 | ∞ | | | |

TABLE 5

EXAMPLE 2 VARIABLE SURFACE DISTANCE

| PROJECTION DISTANCE | INFINITY | 123.93 |
|---|---|---|
| DD[2] | 0.5862 | 0.6080 |
| DD[6] | 0.7384 | 0.7517 |
| DD[9] | 1.9525 | 1.9174 |

TABLE 6

EXAMPLE 2 ASPHERICAL SURFACE COEFFICIENT

| SURFACE NUMBER | 1 | 2 |
|---|---|---|
| K | 8.00000E−01 | −2.79783E+00 |
| A3 | 2.95970E−02 | 3.55774E−02 |
| A4 | 3.74571E−02 | 1.91154E−02 |
| A5 | −1.52517E−02 | −2.95106E−03 |
| A6 | 1.11721E−03 | −1.49300E−03 |
| A7 | 4.54244E−04 | −2.33958E−04 |
| A8 | −3.14170E−05 | 2.50818E−05 |
| A9 | −1.27554E−05 | 2.46706E−05 |
| A10 | −1.02943E−07 | 4.20262E−06 |
| A11 | 1.82316E−07 | 8.03585E−07 |
| A12 | 1.39372E−08 | −5.63873E−07 |

EXAMPLE 3

Figure 3:
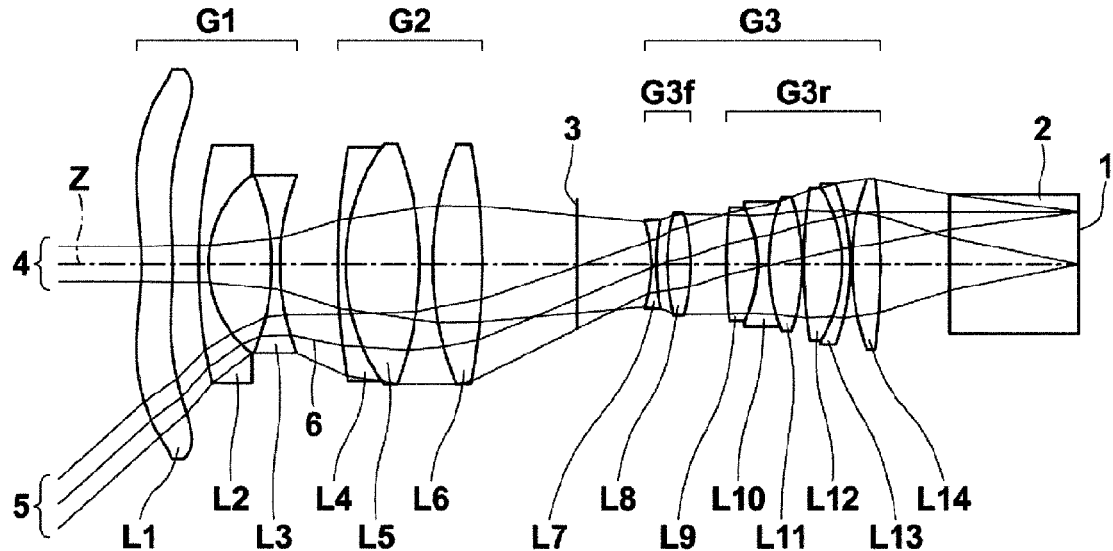
FIG. 3 is a cross section illustrating the lens structure of a lens for projection in Example 3 of the present invention and paths of rays.
Figure 12:
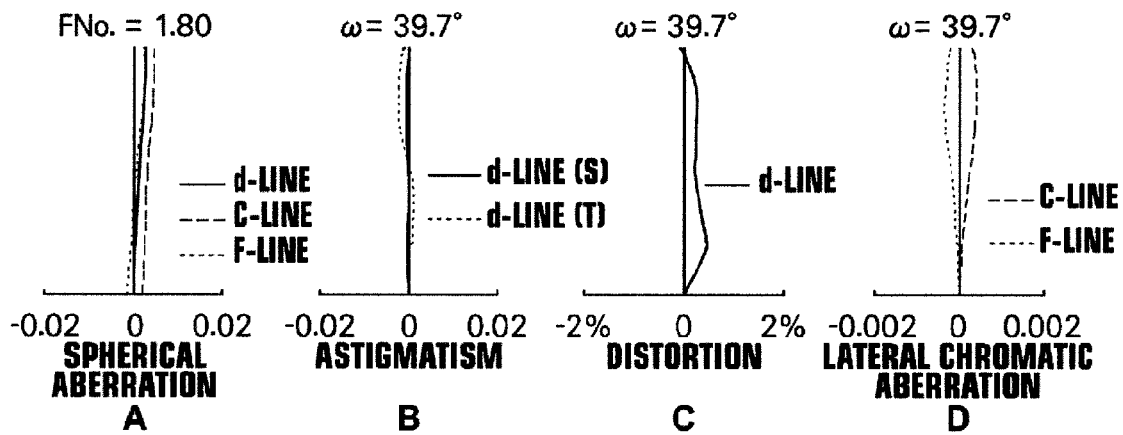
FIG. 12, Sections A through H are aberration diagrams of the lens for projection in Example 3 of the present invention.
Figure 12:
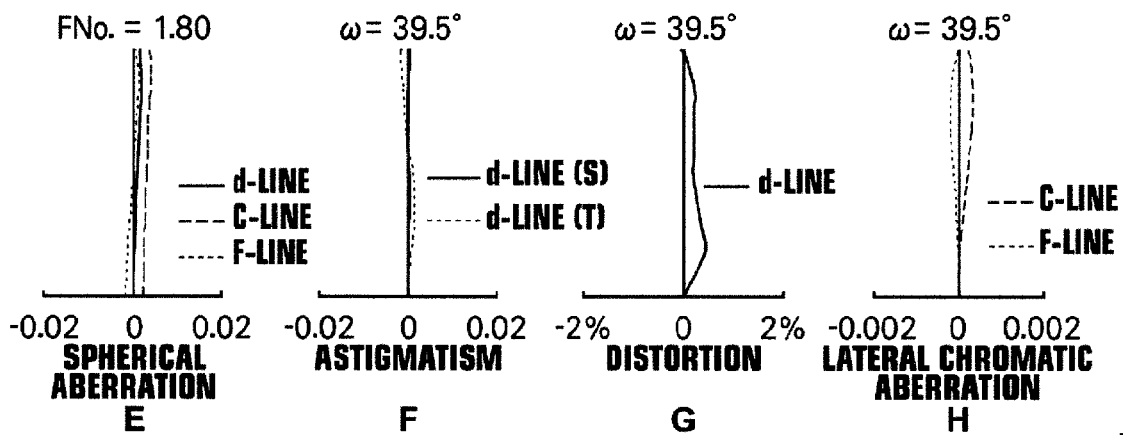

FIG. 3 illustrates the lens structure of a lens for projection in Example 3 and paths of rays. The lens for projection in Example 3 has almost similar structure to the lens for projection in Example 1. Further, lenses that move during focusing are also similar. Table 7, Table 8 and Table 9 show basic lens data, variable surface distances, and aspherical surface coefficients, respectively, about the lens for projection in Example 3. FIG. 12, Sections A through H illustrate aberration diagrams of the lens for projection in Example 3. In the data about Example 3, projection distance is 124.13 when projection distance is finite distance. At this projection distance, the focal length of the entire system is 1.003, and an F-number is 1.80, and a full angle of view is 79.0°.

TABLE 7

EXAMPLE 3 BASIC LENS DATA

| Si | Ri | Di | Ndj | νdj |
|---|---|---|---|---|
| *1 | −3.2230 | 0.5431 | 1.49100 | 57.58 |
| *2 | −4.8199 | DD[2] | | |
| 3 | 7.5380 | 0.1784 | 1.58913 | 61.14 |
| 4 | 1.7127 | 1.0928 | | |
| 5 | −3.4020 | 0.1473 | 1.77250 | 49.60 |
| 6 | 3.6823 | DD[6] | | |
| 7 | 10.1963 | 0.1326 | 1.75520 | 27.51 |
| 8 | 3.0354 | 1.3021 | 1.70154 | 41.24 |
| 9 | −4.9106 | DD[9] | | |
| 10 | 4.5569 | 0.8574 | 1.62041 | 60.29 |
| 11 | −9.5088 | 1.6539 | | |
| 12 | ∞ | 1.2947 | | |
| 13 | −2.1675 | 0.0930 | 1.77250 | 49.60 |
| 14 | 3.6638 | 0.1847 | | |
| 15 | 2.8856 | 0.4069 | 1.56732 | 42.82 |
| 16 | −2.7924 | 0.6146 | | |
| 17 | 7.5423 | 0.5410 | 1.48749 | 70.23 |
| 18 | −1.9101 | 0.0116 | | |
| 19 | −1.8434 | 0.1929 | 1.77250 | 49.60 |
| 20 | 2.6598 | 0.5778 | 1.49700 | 81.54 |
| 21 | −3.2121 | 0.0310 | | |
| 22 | 6.9330 | 0.6777 | 1.48749 | 70.23 |
| 23 | −2.1551 | 0.1396 | 1.84666 | 23.78 |
| 24 | −3.3416 | 0.0310 | | |
| 25 | 3.6539 | 0.4989 | 1.58913 | 61.14 |
| 26 | −10.0605 | 1.1983 | | |
| 27 | ∞ | 2.2498 | 1.51633 | 64.14 |
| 28 | ∞ | | | |

TABLE 8

EXAMPLE 3 VARIABLE SURFACE DISTANCE

| PROJECTION DISTANCE | INFINITY | 124.13 |
|---|---|---|
| DD[2] | 0.4518 | 0.4713 |
| DD[6] | 1.0042 | 1.0177 |
| DD[9] | 0.2311 | 0.1981 |

TABLE 9

EXAMPLE 3 ASPHERICAL SURFACE COEFFICIENT

| SURFACE NUMBER | 1 | 2 |
|---|---|---|
| K | 1.00000E+00 | −3.00911E+00 |
| A3 | 4.62209E−02 | 4.49938E−02 |
| A4 | 5.11051E−02 | 3.71580E−02 |
| A5 | −1.78515E−02 | −1.50276E−02 |
| A6 | −3.33261E−03 | −6.13174E−04 |
| A7 | 3.07321E−03 | 1.92775E−04 |
| A8 | −3.35357E−04 | −3.89029E−05 |
| A9 | −8.82733E−05 | 1.23499E−04 |
| A10 | 1.33156E−05 | −4.58538E−06 |
| A11 | 1.94254E−06 | −7.90504E−06 |

EXAMPLE 4

Figure 4:
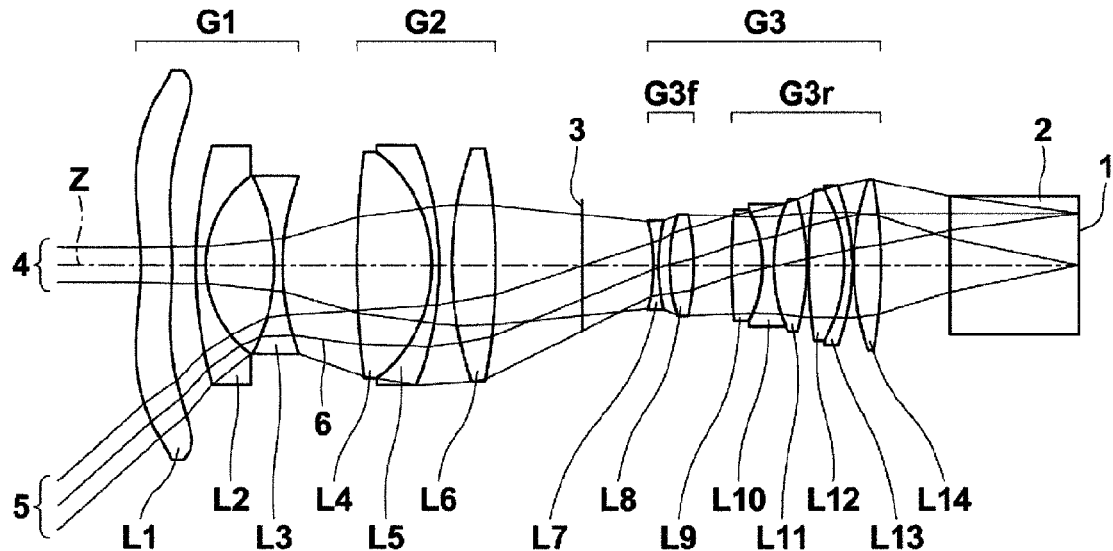
FIG. 4 is a cross section illustrating the lens structure of a lens for projection in Example 4 of the present invention and paths of rays.
Figure 13:
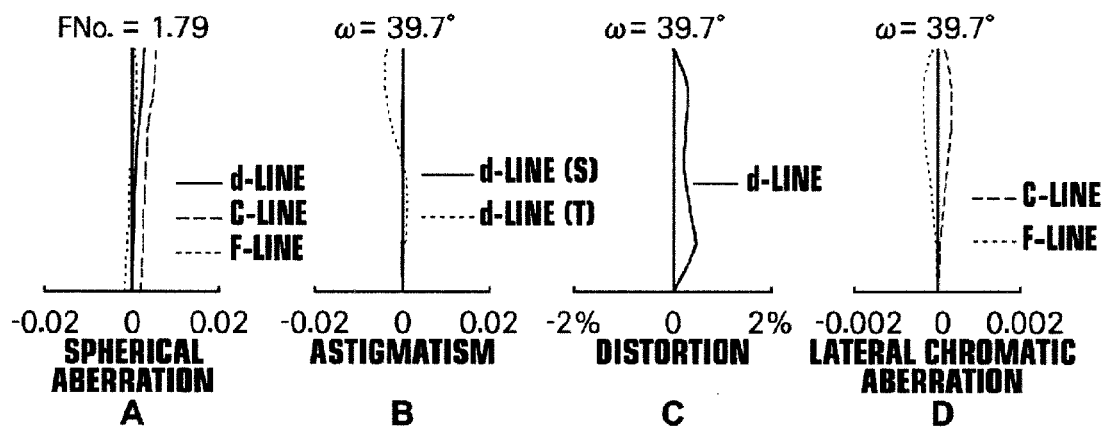
FIG. 13, Sections A through H are aberration diagrams of the lens for projection in Example 4 of the present invention.
Figure 13:
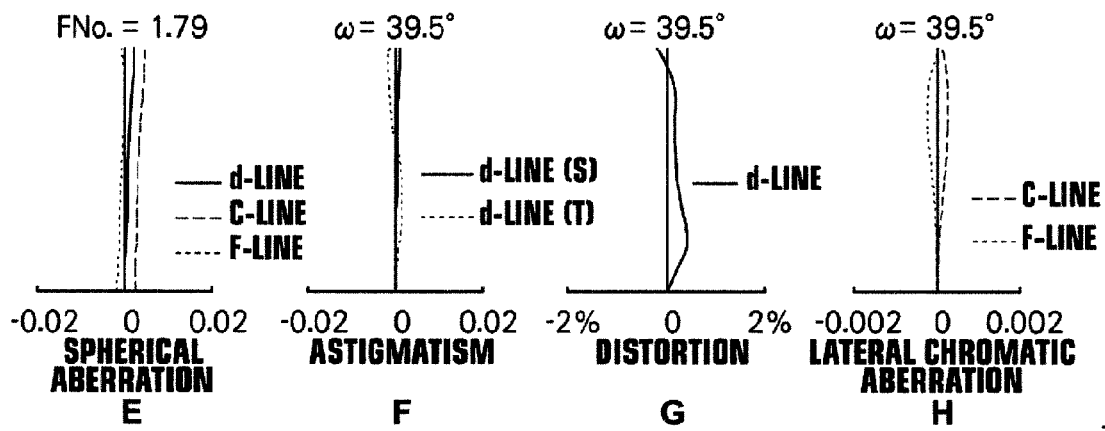

FIG. 4 illustrates the lens structure of a lens for projection in Example 4 and paths of rays. The lens for projection in Example 4 has almost similar structure to the lens for projection in Example 1. However, the lens for projection in Example 4 differs in that lens L4 is a biconvex lens, and lens L5 is a negative meniscus lens with its convex surface facing the reduction side. Meanwhile, lenses that move during focusing in the lens for projection in Example 4 are similar to those of Example 1. Table 10, Table 11 and Table 12 show basic lens data, variable surface distances, and aspherical surface coefficients, respectively, about the lens for projection in Example 4. FIG. 13, Sections A through H illustrate aberration diagrams of the lens for projection in Example 4. In the data about Example 4, projection distance is 123.95 when projection distance is finite distance. At this projection distance, the focal length of the entire system is 1.002, and an F-number is 1.79, and a full angle of view is 79.0°.

TABLE 10

EXAMPLE 4 BASIC LENS DATA

| Si | Ri | Di | Ndj | νdj |
|---|---|---|---|---|
| *1 | −3.2183 | 0.5423 | 1.49100 | 57.58 |
| *2 | −4.8130 | DD[2] | | |
| 3 | 6.4338 | 0.1781 | 1.58913 | 61.14 |
| 4 | 1.6676 | 1.1844 | | |
| 5 | −2.8470 | 0.1472 | 1.62041 | 60.29 |
| 6 | 3.7118 | DD[6] | | |
| 7 | 12.8641 | 1.3130 | 1.72342 | 37.95 |
| 8 | −2.1674 | 0.1316 | 1.78472 | 25.68 |
| 9 | −4.7644 | DD[9] | | |
| 10 | 5.2753 | 0.7518 | 1.62041 | 60.29 |
| 11 | −9.6392 | 1.5087 | | |
| 12 | ∞ | 1.2401 | | |
| 13 | −2.6928 | 0.0929 | 1.77250 | 49.60 |
| 14 | 2.9654 | 0.1935 | | |
| 15 | 2.5468 | 0.4150 | 1.56732 | 42.82 |
| 16 | −3.2701 | 0.6530 | | |
| 17 | 8.8108 | 0.5294 | 1.48749 | 70.23 |
| 18 | −1.8290 | 0.0117 | | |
| 19 | −1.7659 | 0.1944 | 1.77250 | 49.60 |
| 20 | 2.3999 | 0.5756 | 1.49700 | 81.54 |
| 21 | −3.3493 | 0.0310 | | |
| 22 | 7.6458 | 0.6284 | 1.48749 | 70.23 |
| 23 | −2.2301 | 0.1394 | 1.84666 | 23.78 |
| 24 | −3.3724 | 0.0309 | | |
| 25 | 3.8169 | 0.4769 | 1.58913 | 61.14 |
| 26 | −6.9061 | 1.1955 | | |
| 27 | ∞ | 2.2465 | 1.51633 | 64.14 |
| 28 | ∞ | | | |

TABLE 11

EXAMPLE 4 VARIABLE SURFACE DISTANCE

| PROJECTION DISTANCE | INFINITY | 123.95 |
|---|---|---|
| DD[2] | 0.4132 | 0.4255 |
| DD[6] | 1.2908 | 1.3034 |
| DD[9] | 0.2248 | 0.1999 |

TABLE 12

EXAMPLE 4 ASPHERICAL SURFACE COEFFICIENT

| SURFACE NUMBER | 1 | 2 |
|---|---|---|
| K | 1.00000E+00 | −3.00911E+00 |
| A3 | 4.63550E−02 | 4.51244E−02 |
| A4 | 5.13277E−02 | 3.73198E−02 |
| A5 | −1.79553E−02 | −1.51149E−02 |
| A6 | −3.35683E−03 | −6.17631E−04 |
| A7 | 3.10004E−03 | 1.94458E−04 |
| A8 | −3.38775E−04 | −3.92993E−05 |
| A9 | −8.93021E−05 | 1.24938E−04 |
| A10 | 1.34903E−05 | −4.64555E−06 |
| A11 | 1.97089E−06 | −8.02038E−06 |

EXAMPLE 5

Figure 5:
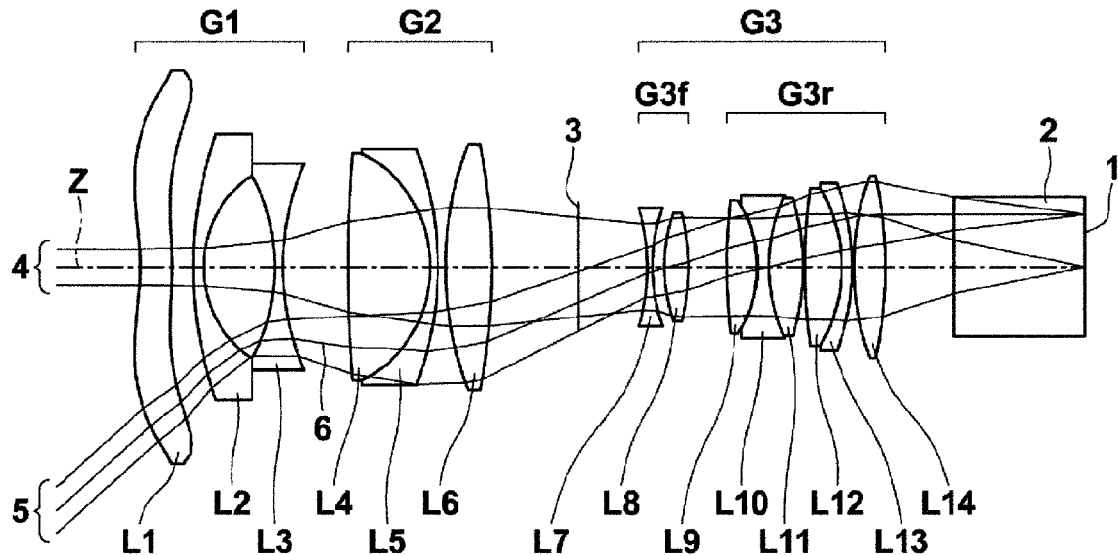
FIG. 5 is a cross section illustrating the lens structure of a lens for projection in Example 5 of the present invention and paths of rays.
Figure 14:
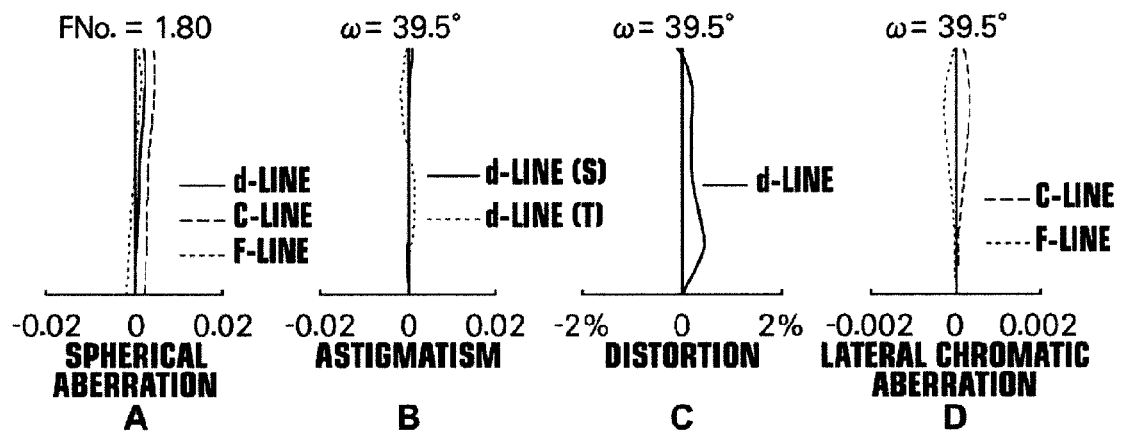
FIG. 14, Sections A through H are aberration diagrams of the lens for projection in Example 5 of the present invention.
Figure 14:
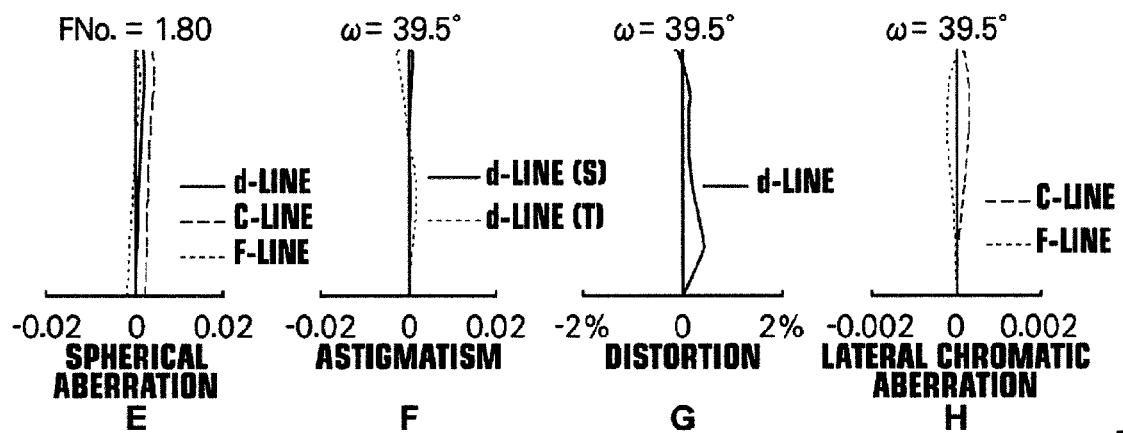

FIG. 5 illustrates the lens structure of a lens for projection in Example 5 and paths of rays. The lens for projection in Example 5 has almost similar structure to the lens for projection in Example 4. The lens for projection in Example 5 is structured in such a manner that focusing is performed by moving a set of lenses L2, L3 and a set of lenses L4, L5 and L6 independently from each other. Table 13, Table 14 and Table 15 show basic lens data, variable surface distances, and aspherical surface coefficients, respectively, about the lens for projection in Example 5. FIG. 14, Sections A through H illustrate aberration diagrams of the lens for projection in Example 5. In the data about Example 5, projection distance is 123.19 when projection distance is finite distance. At this projection distance, the focal length of the entire system is 0.995, and an F-number is 1.80, and a full angle of view is 79.0°.

TABLE 13

EXAMPLE 5 BASIC LENS DATA

| Si | Ri | Di | Ndj | νdj |
|---|---|---|---|---|
| *1 | −3.1986 | 0.5389 | 1.49100 | 57.58 |
| *2 | −4.7835 | DD[2] | | |
| 3 | 5.9031 | 0.1770 | 1.58913 | 61.14 |
| 4 | 1.6583 | 1.2162 | | |
| 5 | −2.8322 | 0.1462 | 1.62041 | 60.29 |
| 6 | 3.7585 | DD[6] | | |
| 7 | 20.2482 | 1.3973 | 1.72342 | 37.95 |
| 8 | −1.9374 | 0.1308 | 1.75520 | 27.51 |
| 9 | −4.8070 | 0.1358 | | |
| 10 | 5.0529 | 0.7972 | 1.65844 | 50.88 |
| 11 | −9.2369 | DD[11] | | |
| 12 | ∞ | 1.169 | | |
| 13 | −2.9726 | 0.0923 | 1.77250 | 49.60 |
| 14 | 2.6656 | 0.1963 | | |
| 15 | 2.3741 | 0.4159 | 1.51742 | 52.43 |
| 16 | −3.1684 | 0.6696 | | |
| 17 | 9.1058 | 0.5201 | 1.51633 | 64.14 |
| 18 | −1.8170 | 0.0115 | | |
| 19 | −1.7537 | 0.1933 | 1.77250 | 49.60 |
| 20 | 2.3612 | 0.5786 | 1.49700 | 81.54 |
| 21 | −3.4395 | 0.0308 | | |
| 22 | 8.1461 | 0.6290 | 1.48749 | 70.23 |
| 23 | −2.2800 | 0.1771 | 1.80518 | 25.42 |
| 24 | −3.4410 | 0.0309 | | |
| 25 | 3.8557 | 0.5383 | 1.58913 | 61.14 |
| 26 | −6.4176 | 1.1889 | | |
| 27 | ∞ | 2.2328 | 1.51633 | 64.14 |
| 28 | ∞ | | | |

TABLE 14

EXAMPLE 5 VARIABLE SURFACE DISTANCE

| PROJECTION DISTANCE | INFINITY | 123.19 |
|---|---|---|
| DD[2] | 0.3694 | 0.3905 |
| DD[6] | 1.1230 | 1.1376 |
| DD[11] | 1.4877 | 1.4520 |

TABLE 15

EXAMPLE 5 ASPHERICAL SURFACE COEFFICIENT

| SURFACE NUMBER | 1 | 2 |
|---|---|---|
| K | 1.00000E+00 | −3.00911E+00 |
| A3 | 4.69282E−02 | 4.56824E−02 |

TABLE 15-continued

EXAMPLE 5 ASPHERICAL SURFACE COEFFICIENT

| SURFACE NUMBER | 1 | 2 |
|---|---|---|
| A4 | 5.22827E−02 | 3.80142E−02 |
| A5 | −1.84021E−02 | −1.54911E−02 |
| A6 | −3.46157E−03 | −6.36903E−04 |
| A7 | 3.21647E−03 | 2.01762E−04 |
| A8 | −3.53666E−04 | −4.10267E−05 |
| A9 | −9.38021E−05 | 1.31234E−04 |
| A10 | 1.42575E−05 | −4.90972E−06 |
| A11 | 2.09580E−06 | −8.52871E−06 |

EXAMPLE 6

Figure 6:
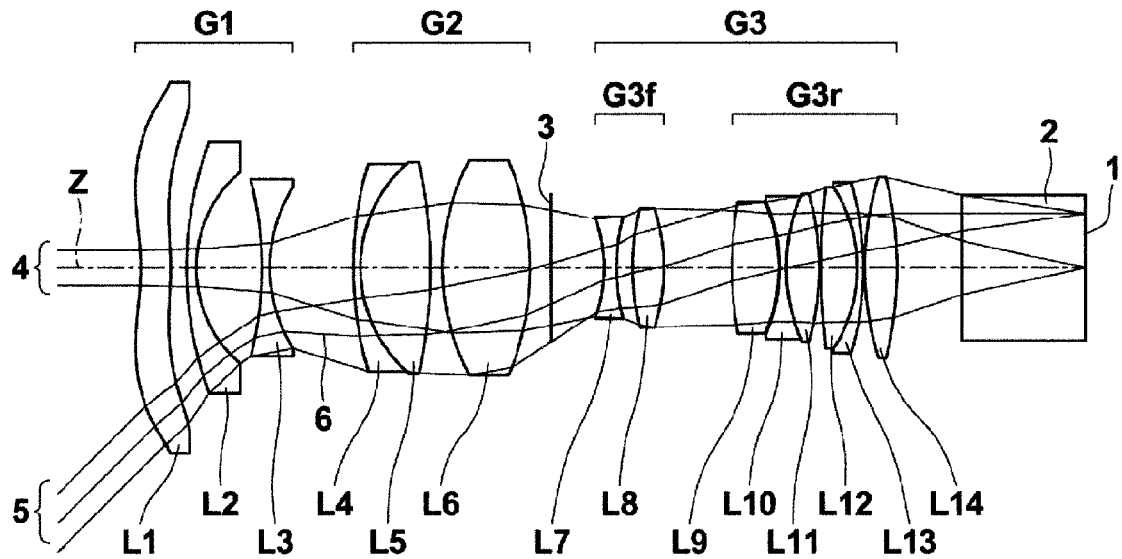
FIG. 6 is a cross section illustrating the lens structure of a lens for projection in Example 6 of the present invention and paths of rays.
Figure 15:
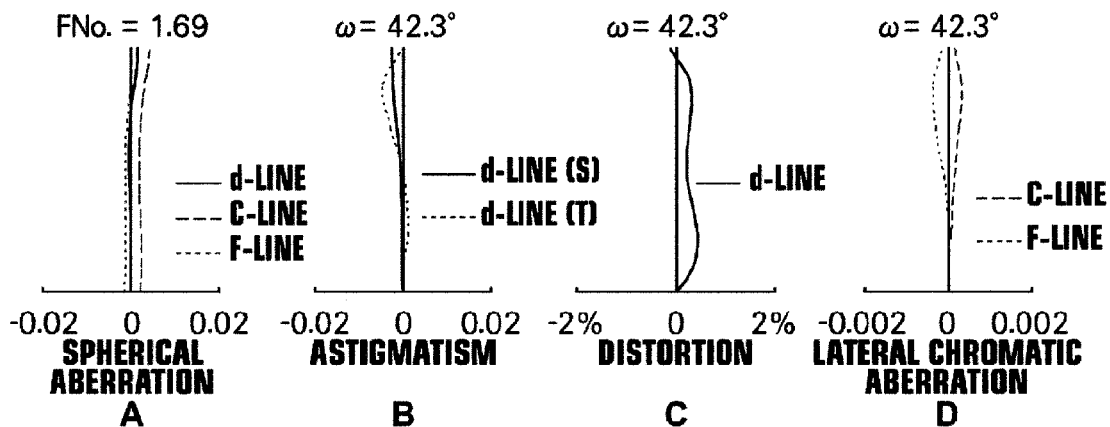
FIG. 15, Sections A through H are aberration diagrams of the lens for projection in Example 6 of the present invention.
Figure 15:
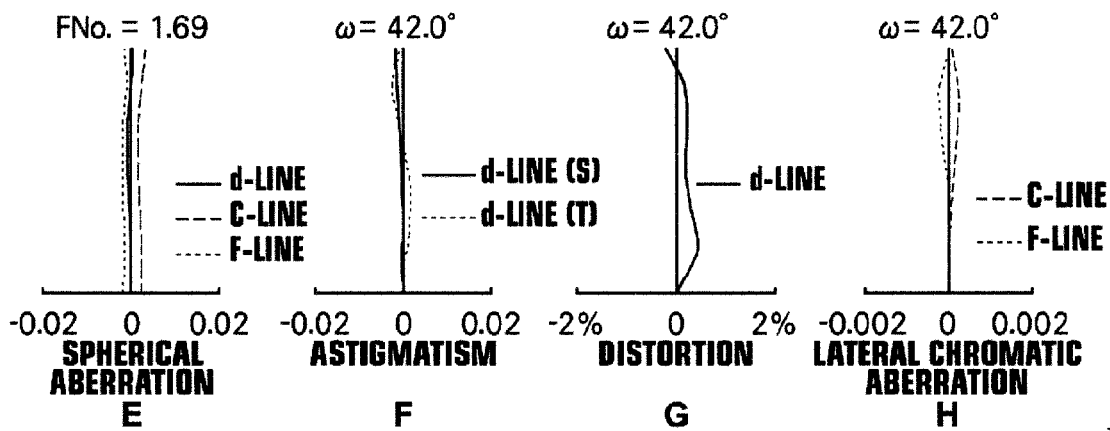

FIG. 6 illustrates the lens structure of a lens for projection in Example 6 and paths of rays. The lens for projection in Example 6 has almost similar structure to the lens for projection in Example 1. Further, lenses that move during focusing are also similar. Table 16, Table 17 and Table 18 show basic lens data, variable surface distances, and aspherical surface coefficients, respectively, about the lens for projection in Example 6. FIG. 15, Sections A through H illustrate aberration diagrams of the lens for projection in Example 6. In the data about Example 6, projection distance is 124.06 when projection distance is finite distance. At this projection distance, the focal length of the entire system is 1.002, and an F-number is 1.69, and a full angle of view is 84.0°.

TABLE 16

EXAMPLE 6 BASIC LENS DATA

| Si | Ri | Di | Ndj | νdj |
|---|---|---|---|---|
| *1 | −3.2213 | 0.5428 | 1.49100 | 57.58 |
| *2 | −4.8174 | DD[2] | | |
| 3 | 5.5602 | 0.1783 | 1.61800 | 63.33 |
| 4 | 2.0049 | 1.1902 | | |
| 5 | −5.4562 | 0.1473 | 1.77250 | 49.60 |
| 6 | 2.3219 | DD[6] | | |
| 7 | 5.6873 | 0.1327 | 1.80518 | 25.42 |
| 8 | 2.2226 | 1.2683 | 1.65412 | 39.68 |
| 9 | −7.2060 | DD[9] | | |
| 10 | 3.5749 | 1.5973 | 1.51742 | 52.43 |
| 11 | −4.3545 | 0.3932 | | |
| 12 | ∞ | 0.9479 | | |
| 13 | −2.4159 | 0.2326 | 1.77250 | 49.60 |
| 14 | 3.0335 | 0.2883 | | |
| 15 | 3.7271 | 0.5753 | 1.59551 | 39.24 |
| 16 | −3.0424 | 1.2542 | | |
| 17 | 5.5814 | 0.8575 | 1.48749 | 70.23 |
| 18 | −2.4831 | 0.0208 | | |
| 19 | −2.4826 | 0.1170 | 1.77250 | 49.60 |
| 20 | 2.8677 | 0.5947 | 1.49700 | 81.54 |
| 21 | −4.0893 | 0.0309 | | |
| 22 | 9.9627 | 0.6553 | 1.49700 | 81.54 |
| 23 | −2.3586 | 0.1163 | 1.84666 | 23.78 |
| 24 | −4.5971 | 0.0309 | | |
| 25 | 4.6798 | 0.5851 | 1.58913 | 61.14 |
| 26 | −5.7818 | 1.1964 | | |
| 27 | ∞ | 2.2486 | 1.51633 | 64.14 |
| 28 | ∞ | | | |

TABLE 17

EXAMPLE 6 VARIABLE SURFACE DISTANCE

| PROJECTION DISTANCE | INFINITY | 124.06 |
|---|---|---|
| DD[2] | 0.2878 | 0.3027 |
| DD[6] | 1.5393 | 1.5546 |
| DD[9] | 0.2217 | 0.1915 |

TABLE 18

EXAMPLE 6 ASPHERICAL SURFACE COEFFICIENT

| SURFACE NUMBER | 1 | 2 |
|---|---|---|
| K | 1.00000E+00 | −3.00911E+00 |
| A3 | 4.62690E−02 | 4.50407E−02 |
| A4 | 5.11849E−02 | 3.72160E−02 |
| A5 | −1.78887E−02 | −1.50589E−02 |
| A6 | −3.34129E−03 | −6.14771E−04 |
| A7 | 3.08282E−03 | 1.93378E−04 |
| A8 | −3.36581E−04 | −3.90448E−05 |
| A9 | −8.86414E−05 | 1.24014E−04 |
| A10 | 1.33781E−05 | −4.60690E−06 |
| A11 | 1.95267E−06 | −7.94627E−06 |

EXAMPLE 7

Figure 7:
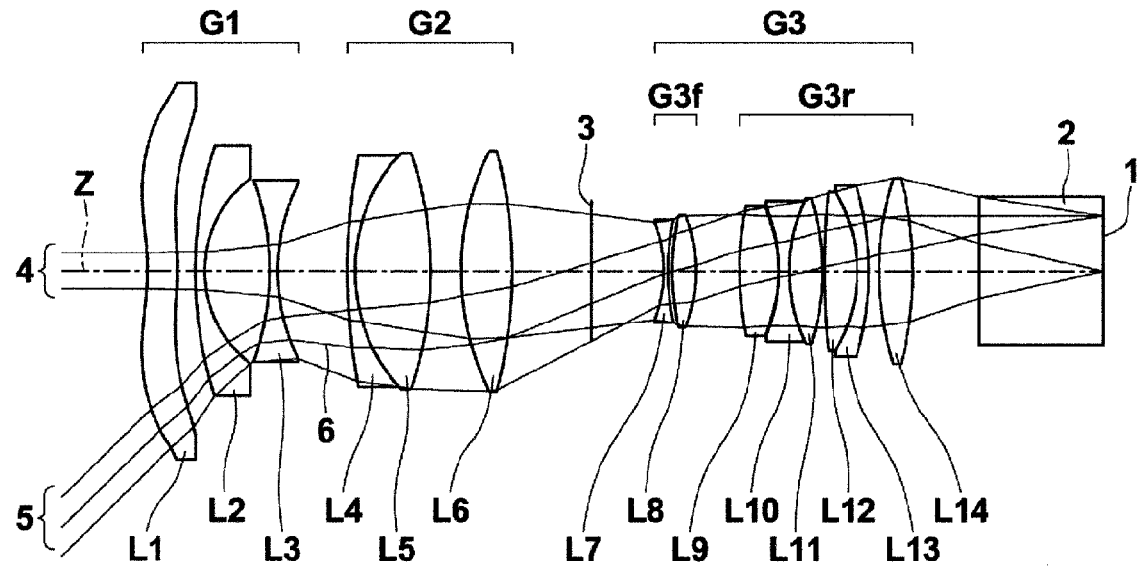
FIG. 7 is a cross section illustrating the lens structure of a lens for projection in Example 7 of the present invention and paths of rays.
Figure 16:
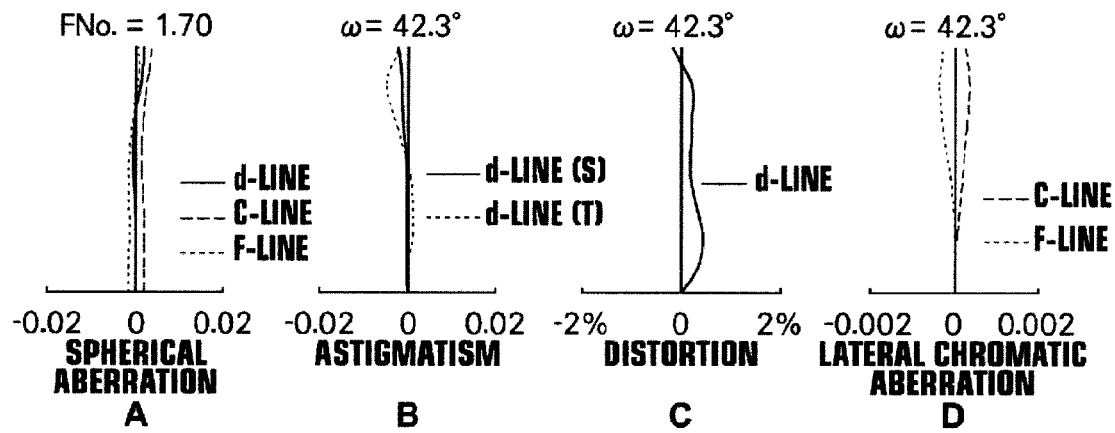
FIG. 16, Sections A through H are aberration diagrams of the lens for projection in Example 7 of the present invention.
Figure 16:
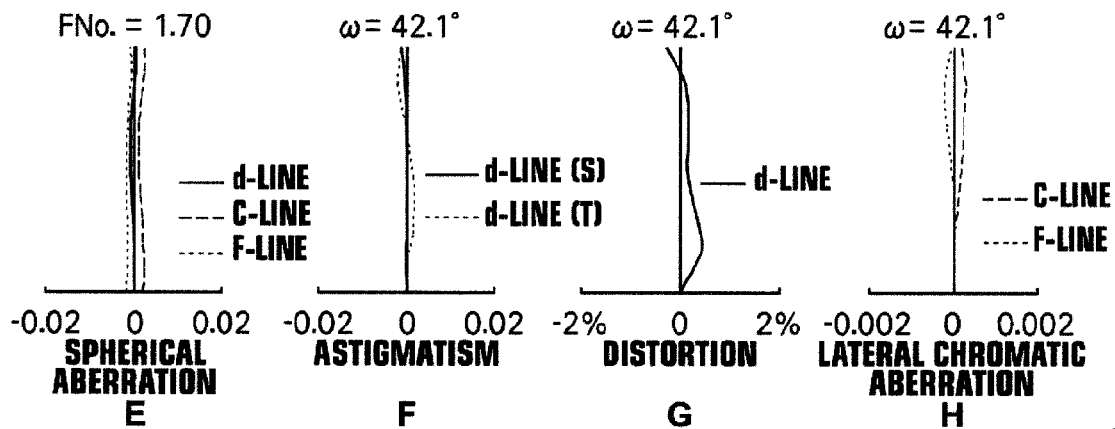

FIG. 7 illustrates the lens structure of a lens for projection in Example 7 and paths of rays. The lens for projection in Example 7 has almost similar structure to the lens for projection in Example 1. Further, lenses that move during focusing are also similar. Table 19, Table 20 and Table 21 show basic lens data, variable surface distances, and aspherical surface coefficients, respectively, about the lens for projection in Example 7. FIG. 16, Sections A through H illustrate aberration diagrams of the lens for projection in Example 7. In the data about Example 7, projection distance is 124.13 when projection distance is finite distance. At this projection distance, the focal length of the entire system is 1.002, and an F-number is 1.70, and a full angle of view is 84.2°.

TABLE 19

EXAMPLE 7 BASIC LENS DATA

| Si | Ri | Di | Ndj | νdj |
|---|---|---|---|---|
| *1 | −3.2232 | 0.5431 | 1.49100 | 57.58 |
| *2 | −4.8202 | DD[2] | | |
| 3 | 6.0910 | 0.1785 | 1.61800 | 63.33 |
| 4 | 1.8074 | 1.1648 | | |
| 5 | −4.1093 | 0.1474 | 1.77250 | 49.60 |
| 6 | 2.9738 | DD[6] | | |
| 7 | 9.5563 | 0.1326 | 1.71736 | 29.52 |
| 8 | 2.6628 | 1.3720 | 1.65844 | 50.88 |
| 9 | −5.6394 | DD[9] | | |
| 10 | 4.1864 | 0.9088 | 1.54814 | 45.79 |
| 11 | −7.3178 | 1.4233 | | |
| 12 | ∞ | 1.3145 | | |
| 13 | −2.0136 | 0.0775 | 1.77250 | 49.60 |
| 14 | 3.6668 | 0.0822 | | |
| 15 | 3.8685 | 0.4239 | 1.59551 | 39.24 |
| 16 | −2.2567 | 0.7804 | | |
| 17 | 5.1702 | 0.6983 | 1.48749 | 70.23 |
| 18 | −2.4269 | 0.0038 | | |
| 19 | −2.6268 | 0.1948 | 1.77250 | 49.60 |
| 20 | 2.5765 | 0.5987 | 1.49700 | 81.54 |
| 21 | −3.6959 | 0.0310 | | |
| 22 | 11.3291 | 0.5976 | 1.49700 | 81.54 |
| 23 | −2.3726 | 0.2087 | 1.84666 | 23.78 |

TABLE 19-continued

EXAMPLE 7 BASIC LENS DATA

| Si | Ri | Di | Ndj | νdj |
|---|---|---|---|---|
| 24 | −4.5013 | 0.1839 | | |
| 25 | 4.5655 | 0.6088 | 1.58913 | 61.14 |
| 26 | −5.6159 | 1.1950 | | |
| 27 | ∞ | 2.2499 | 1.51633 | 64.14 |
| 28 | ∞ | | | |

TABLE 20

EXAMPLE 7 VARIABLE SURFACE DISTANCE

| PROJECTION DISTANCE | INFINITY | 124.13 |
|---|---|---|
| DD[2] | 0.3304 | 0.3447 |
| DD[6] | 1.2520 | 1.2663 |
| DD[9] | 0.5571 | 0.5285 |

TABLE 21

EXAMPLE 7 ASPHERICAL SURFACE COEFFICIENT

| SURFACE NUMBER | 1 | 2 |
|---|---|---|
| K | 1.00000E+00 | −3.00911E+00 |
| A3 | 4.62164E−02 | 4.49895E−02 |
| A4 | 5.10977E−02 | 3.71526E−02 |
| A5 | −1.78481E−02 | −1.50247E−02 |
| A6 | −3.33181E−03 | −6.13027E−04 |
| A7 | 3.07233E−03 | 1.92720E−04 |
| A8 | −3.35244E−04 | −3.88898E−05 |
| A9 | −8.82394E−05 | 1.23452E−04 |
| A10 | 1.33099E−05 | −4.58340E−06 |
| A11 | 1.94161E−06 | −7.90125E−06 |

Table 22 shows values corresponding to conditional formulas (1) through (12) in Examples 1 through 7. Further, Table 23 shows various numerical values in Examples 1 through 7. In Table 23, fG3r represents the focal length of rear group G3r. Table 22 and Table 23 show values for d-line when projection distance is infinity.

TABLE 22

| CONDITIONAL FORMULA | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| (1) | fFG3/f | −0.347 | −0.342 | −0.016 | 0.035 | 0.119 | 0.418 | −0.024 |
| (2) | f/fG23 | −0.094 | −0.106 | −0.136 | −0.074 | −0.074 | −0.016 | −0.073 |
| (3) | da/f | 0.066 | 0.130 | 0.185 | 0.194 | 0.196 | 0.288 | 0.082 |
| (4) | fG2/fG3 | 1.173 | 1.149 | 1.140 | 1.197 | 1.207 | 1.122 | 1.135 |
| (5) | (Hsm − Imφ/2)/Hsj | 0.693 | 0.669 | 0.668 | 0.670 | 0.653 | 0.719 | 0.737 |
| (6) | |Hfm/Imφ| | 1.575 | 1.594 | 1.657 | 1.662 | 1.656 | 1.624 | 1.607 |
| (7) | fG1/f | −1.070 | −1.018 | −1.035 | −1.120 | −1.132 | −1.098 | −1.059 |
| (8) | fG2/f | 3.240 | 3.267 | 2.747 | 2.908 | 2.835 | 2.783 | 3.043 |
| (9) | fG3f/f | −11.299 | −13.164 | −9.681 | −10.756 | −8.934 | −7.871 | −8.192 |
| (10) | Bf/f | 2.678 | 2.677 | 2.682 | 2.677 | 2.661 | 2.679 | 2.679 |
| (11) | FNo | 1.70 | 1.70 | 1.80 | 1.79 | 1.80 | 1.69 | 1.70 |
| (12) | 2ω | 84.7 | 84.7 | 79.4 | 79.3 | 79.0 | 84.5 | 84.6 |

TABLE 23

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| f | 1.000 | 1.000 | 1.000 | 1.000 | 1.000 | 1.000 | 1.000 |
| Bf | 2.678 | 2.677 | 2.682 | 2.677 | 2.661 | 2.679 | 2.679 |
| Imφ | 1.812 | 1.812 | 1.660 | 1.658 | 1.648 | 1.814 | 1.815 |
| fG1 | −1.070 | −1.018 | −1.035 | −1.120 | −1.132 | −1.098 | −1.059 |
| fG2 | 3.240 | 3.267 | 2.747 | 2.908 | 2.835 | 2.783 | 3.043 |
| fG3 | 2.762 | 2.844 | 2.409 | 2.430 | 2.350 | 2.481 | 2.680 |
| fG23 | −10.622 | −9.476 | −7.341 | −13.462 | −13.434 | −64.213 | −13.723 |
| fG3f | −11.299 | −13.164 | −9.681 | −10.756 | −8.934 | −7.871 | −8.192 |
| fG3r | 2.995 | 3.157 | 2.781 | 2.801 | 2.723 | 3.265 | 3.012 |
| fFG3 | −0.347 | −0.342 | −0.016 | 0.035 | 0.119 | 0.418 | −0.024 |
| da | 0.0662 | 0.1295 | 0.1847 | 0.1935 | 0.1963 | 0.2883 | 0.0822 |
| Hsj | 0.822 | 0.820 | 0.776 | 0.783 | 0.774 | 0.835 | 0.834 |
| Hsm | 1.476 | 1.455 | 1.349 | 1.353 | 1.329 | 1.507 | 1.522 |
| Hfm | −2.855 | −2.889 | −2.751 | −2.755 | −2.728 | −2.947 | −2.918 |

So far, the present invention has been described by using embodiments and examples. However, the lens for projection of the present invention is not limited to the aforementioned examples, and various modifications of the mode are possible. For example, the curvature radius, a surface distance, a refractive index, an Abbe number and aspherical surface coefficients of each lens may be appropriately modified.

Further, the structure of the projection-type display apparatus of the present invention is not limited to the aforementioned structure. For example, light valves to be used and optical members to be used to separate rays or combine rays are not limited to the aforementioned structure, and various modifications of the mode are possible.

What is claimed is:

1. A lens for projection substantially consisting of three lens groups of:
 a first lens group having negative refractive power;
 a second lens group having positive refractive power; and
 a third lens group having positive refractive power in this order from a magnification side,
 wherein a reduction side is telecentric, and
 wherein the first lens group substantially consists of three lenses of an aspheric plastic lens that is made of plastic material and includes at least one aspherical surface and two negative lenses arranged in this order from the magnification side, and
 wherein the second lens group substantially consists of three lenses, and
 wherein the third lens group consists of a front group having negative refractive power and a rear group having positive refractive power arranged in this order from the magnification side with an air space therebetween, and
 wherein the front group substantially consists of two lenses of a negative single lens and a positive single lens arranged in this order from the magnification side with an air space therebetween, and the air space being narrower than the air space between the front group and the rear group, and
 wherein the following conditional formula (1) is satisfied:

$$-0.7 < fFG3/f < 0.7 \qquad (1), \text{where}$$

fFG3: a front focus of the third lens group, and
 f: a focal length of an entire system when projection distance is infinity.

2. The lens for projection, as defined in claim 1, wherein the following conditional formula (2) is satisfied:

$$-0.3 < f/fG23 < 0 \qquad (2), \text{where}$$

fG23: a combined focal length of the second lens group and the third lens group.

3. The lens for projection, as defined in claim 1, wherein the following conditional formula (3) is satisfied:

$$da/f < 0.4 \qquad (3), \text{where}$$

da: an air space on an optical axis between the negative single lens and the positive single lens in the front group.

4. The lens for projection, as defined in claim 1, wherein the following conditional formula (4) is satisfied:

$$1.0 < fG2/fG3 < 1.4 \qquad (4), \text{where}$$

fG2: a focal length of the second lens group, and
 fG3: a focal length of the third lens group.

5. The lens for projection, as defined in claim 1, wherein the following conditional formula (5) is satisfied:

$$0.55 < (Hsm - Im\phi/2)/Hsj \qquad (5), \text{where}$$

Hsm: a maximum ray height at a most reduction-side lens surface,

Imφ: a maximum effective image circle diameter on the reduction side, and
 Hsj: a maximum ray height of axial rays at the most reduction-side lens surface.

6. The lens for projection, as defined in claim 1, wherein the following conditional formula (6) is satisfied:

$$|Hfm/Im\phi| < 2.0 \qquad (6), \text{where}$$

Hfm: a maximum ray height at a most magnification-side lens surface, and
 Imφ: a maximum effective image circle diameter on the reduction side.

7. The lens for projection, as defined in claim 1, wherein the following conditional formula (7) is satisfied:

$$-1.5 < fG1/f < -0.7 \qquad (7), \text{where}$$

fG1: a focal length of the first lens group.

8. The lens for projection, as defined in claim 1, wherein the following conditional formula (8) is satisfied:

$$1.5 < fG2/f < 6.0 \qquad (8), \text{where}$$

fG2: a focal length of the second lens group.

9. The lens for projection, as defined in claim 1, wherein the second lens group substantially consists of three lenses of a cemented lens having positive refractive power and consisting of two lenses cemented together, and a positive single lens in this order from the magnification side, and one of the two lenses of the cemented lens being a positive lens, and the other one of the two lenses of the cemented lens being a negative lens.

10. The lens for projection, as defined in claim 9, wherein both of the cemented lens and the single lens in the second lens group are biconvex.

11. The lens for projection, as defined in claim 1, wherein the following conditional formula (9) is satisfied:

$$fG3f/f < -3.0 \qquad (9), \text{where}$$

fG3f: a focal length of the front group in the third lens group.

12. The lens for projection, as defined in claim 1, wherein the lens for projection is structured to perform focusing by moving at least one of lenses in the first lens group and the second lens group except the aspheric plastic lens.

13. The lens for projection, as defined in claim 1, wherein the following conditional formula (10) is satisfied:

$$2.00 < Bf/f \qquad (10), \text{where}$$

Bf: a back focus of the entire system.

14. The lens for projection, as defined in claim 1, wherein the following conditional formula (11) is satisfied:

$$FNo < 2.00 \qquad (11), \text{where}$$

FNo: an F-number.

15. The lens for projection, as defined in claim 1, wherein the following conditional formula (12) is satisfied:

$$70° < 2\omega \qquad (12), \text{where}$$

2ω: a maximum full angle of view.

16. The lens for projection, as defined in claim 1, wherein the following conditional formula (1') is satisfied:

$$-0.5 < fFG3/f < 0.5 \qquad (1').$$

17. The lens for projection, as defined in claim 2, wherein the following conditional formula (2') is satisfied:

$$-0.2 < f/fG23 < 0 \qquad (2').$$

18. The lens for projection, as defined in claim 3, wherein the following conditional formula (3') is satisfied:

$$da/f < 0.3 \tag{3'}$$

19. The lens for projection, as defined in claim 4, wherein the following conditional formula (4') is satisfied:

$$1.0 < fG2/fG3 < 1.2 \tag{4'}$$

20. A projection-type display apparatus comprising:
a light source;
a light valve on which light from the light source is incident; and
the lens for projection, as defined in claim 1, as a lens for projection that projects an optical image of light that has been optically modulated by the light valve onto a screen.

* * * * *